United States Patent
Fukuda et al.

(10) Patent No.: US 10,950,864 B2
(45) Date of Patent: Mar. 16, 2021

(54) NEGATIVE ELECTRODE, BATTERY, BATTERY PACK, ELECTRONIC DEVICE, ELECTRICALLY DRIVEN VEHICLE, POWER STORAGE DEVICE, AND POWER SYSTEM

(71) Applicant: MURATA MANUFACTURING CO., LTD., Kyoto (JP)

(72) Inventors: Masumi Fukuda, Kyoto (JP); Taichi Kogure, Kyoto (JP); Takaaki Matsui, Kyoto (JP); Yoshikazu Kato, Kyoto (JP); Ami Onuma, Kyoto (JP); Miki Miyazaki, Kyoto (JP); Seiji Onoe, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/423,946

(22) Filed: May 28, 2019

(65) Prior Publication Data
US 2019/0288289 A1 Sep. 19, 2019

Related U.S. Application Data

(63) Continuation of application No. PCT/JP2017/042643, filed on Nov. 28, 2017.

(30) Foreign Application Priority Data

Nov. 28, 2016 (JP) .............................. JP2016-229626

(51) Int. Cl.
*H01M 4/13* (2010.01)
*H01M 4/62* (2006.01)
*H01M 4/02* (2006.01)

(52) U.S. Cl.
CPC .............. *H01M 4/622* (2013.01); *H01M 4/13* (2013.01); *H01M 4/62* (2013.01); *H01M 2004/021* (2013.01); *H01M 2004/027* (2013.01)

(58) Field of Classification Search
CPC .......... H01M 4/622; H01M 4/13; H01M 4/62; H01M 2004/021; H01M 2004/027
See application file for complete search history.

(56) References Cited

U.S. PATENT DOCUMENTS

| | | | |
|---|---|---|---|
| 2010/0092871 A1 | 4/2010 | Medlege et al. | |
| 2013/0260217 A1 | 10/2013 | Matsui et al. | |

FOREIGN PATENT DOCUMENTS

| | | |
|---|---|---|
| JP | H0574461 A | 3/1993 |
| JP | H07122262 A | 5/1995 |
| JP | 1092416 | 4/1998 |
| JP | 10106540 | 4/1998 |

(Continued)

OTHER PUBLICATIONS

JPH1092416 translation (Year: 1998).*

(Continued)

*Primary Examiner* — Jane J Rhee
(74) *Attorney, Agent, or Firm* — K&L Gates LLP

(57) ABSTRACT

A battery includes a positive electrode, a negative electrode, and an electrolyte. The negative electrode includes an active material having grains and a binder having a reticulated structure. In this battery, spaces between the grains of the active material are filled with the reticulated structure of the binder.

17 Claims, 8 Drawing Sheets

(56) References Cited

FOREIGN PATENT DOCUMENTS

| | | |
|---|---|---|
| JP | H1092416 A | 4/1998 |
| JP | 2010-518568 | 5/2010 |
| JP | 2010518568 A | 5/2010 |
| JP | 2011-204576 | 10/2011 |
| JP | 2013-134909 | 7/2013 |
| JP | 2013-211228 | 10/2013 |
| JP | 2013211228 A | 10/2013 |
| JP | 2014075261 A | 4/2014 |
| JP | 2014-232708 | 12/2014 |
| JP | 2015173033 A | 10/2015 |
| JP | 2016-021322 | 2/2016 |
| JP | 2016-046042 | 4/2016 |
| WO | 2009/031715 | 3/2009 |

OTHER PUBLICATIONS

FR2766969 translation (Year: 1999).*
Japanese Office Action dated Feb. 18, 2020 in corresponding Japanese Application No. 2018-553020.
Japanese Office Action dated Sep. 8, 2020 in corresponding Japanese Application No. 2018-553020.

* cited by examiner

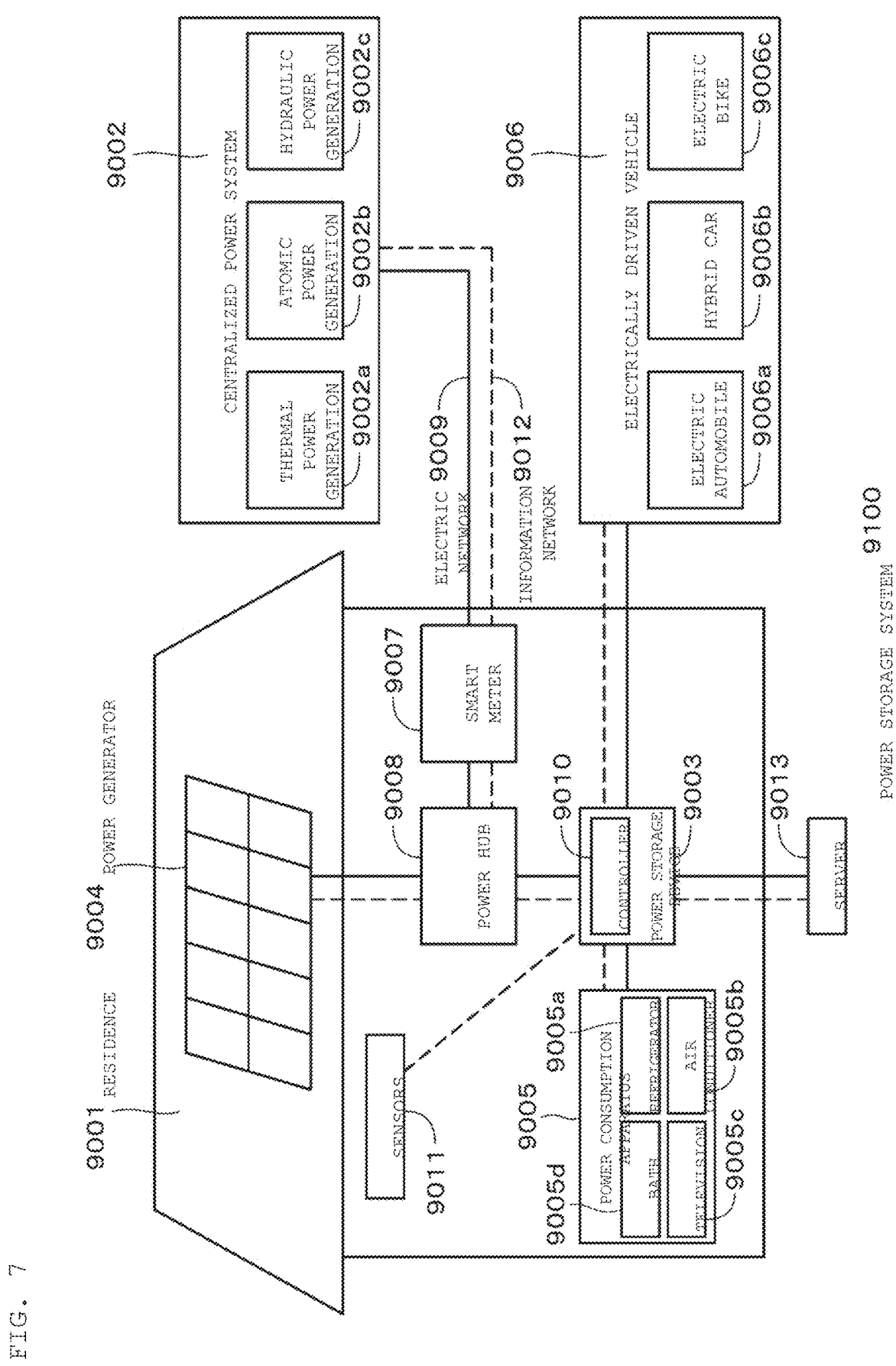

NEGATIVE ELECTRODE, BATTERY, BATTERY PACK, ELECTRONIC DEVICE, ELECTRICALLY DRIVEN VEHICLE, POWER STORAGE DEVICE, AND POWER SYSTEM

CROSS REFERENCE TO RELATED APPLICATIONS

The present application is a continuation of PCT patent application no. PCT/JP2017/042643, filed on Nov. 28, 2017, which claims priority to Japanese patent application no. JP2016-229626 filed on Nov. 28, 2016, the entire contents of which are being incorporated herein by reference.

BACKGROUND

The technology generally relates to a negative electrode, a battery, a battery pack, an electronic device, an electrically driven vehicle, a power storage device, and a power system.

In a negative electrode, a binder is typically so present that covers surfaces of grains of an active material. The active material grains, therefore, can only be bound to one another or bound to a current collector on part of their surfaces alone. This may result in poor contact between the grains and between the grains and the current collector. In order to arrest decline of desired close contact therebetween, it may be suggested to add a certain amount or more of the binder to a compound prepared for electrode. If the binder to be added is increased, however, the binder may be oversupplied to between the active material grains and between the active material grains and the current collector.

As a result, surfaces of the active material grains may be covered with the binder that does not participate in the binding action. Such binder-covered active material grains, if present, may inhibit conduction of ions, consequently increasing a battery's internal resistance. In case the internal resistance is thus increased, properties of the battery may be undermined, for example, charge-and-discharge efficiency, capacity, and output characteristics.

SUMMARY

In the conventional technology, it is difficult to provide close contact between the active material grains while suppressing increase of the battery's internal resistance.

The present technology as disclosed herein is directed to providing a negative electrode that may allow closer contact between grains of an active material while suppressing increase of a battery's internal resistance. This disclosure is further directed to providing a battery, a battery pack, an electronic device, an electrically driven vehicle, a power storage device, and a power system including the negative electrode.

To address the issues described above, according to an embodiment of the present technology, a battery is provided. The battery includes a positive electrode, a negative electrode, and an electrolyte. The negative electrode includes an active material having grains and a binder having a reticulated structure. In this battery, spaces between the grains of the active material are filled with the reticulated structure of the binder.

According to an embodiment of the present technology, a negative electrode is provided. The negative electrode includes an active material having grains and a binder having a reticulated structure. In this negative electrode, spaces between the grains of the active material are filled with the reticulated structure of the binder.

According to an embodiment of the present technology, a battery pack is provided. The battery pack includes the battery according to the embodiment as described herein and a controller configured to control the battery.

According to an embodiment of the present technology, an electronic device is provided. The electronic device includes the battery according to the embodiment as described herein and is configured to receive power from the battery.

According to an embodiment of the present technology, an electrically driven vehicle is provided. The electrically driven vehicle includes the battery according to the embodiment as described herein, a converter configured to receive power from the battery and covert the power into a driving force for the electrically driven vehicle, and a controller configured to process information associated with vehicle control based on battery-related information.

According to an embodiment of the present technology, a power storage device is provided. The power storage device includes the battery according to the embodiment as described herein and is configured to supply power to an electronic device connected to the battery.

According to an embodiment of the present technology, a power system is provided. The power system includes the battery according to the embodiment as described herein and is configured to receive power from the battery.

The aspects of the technology described thus far may successfully provide close contact between the active material grains while suppressing increase of a battery's internal resistance.

Effects obtainable by the technology are not necessarily limited to those described herein. This technology may provide the effects described herein and other suitable properties relating to the present technology may be realized and as further described.

BRIEF DESCRIPTION OF THE FIGURES

FIG. 7 is a schematic block diagram illustrating an example of a configuration of a power storage system used in housing as an exemplified application according to an embodiment of the present technology.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
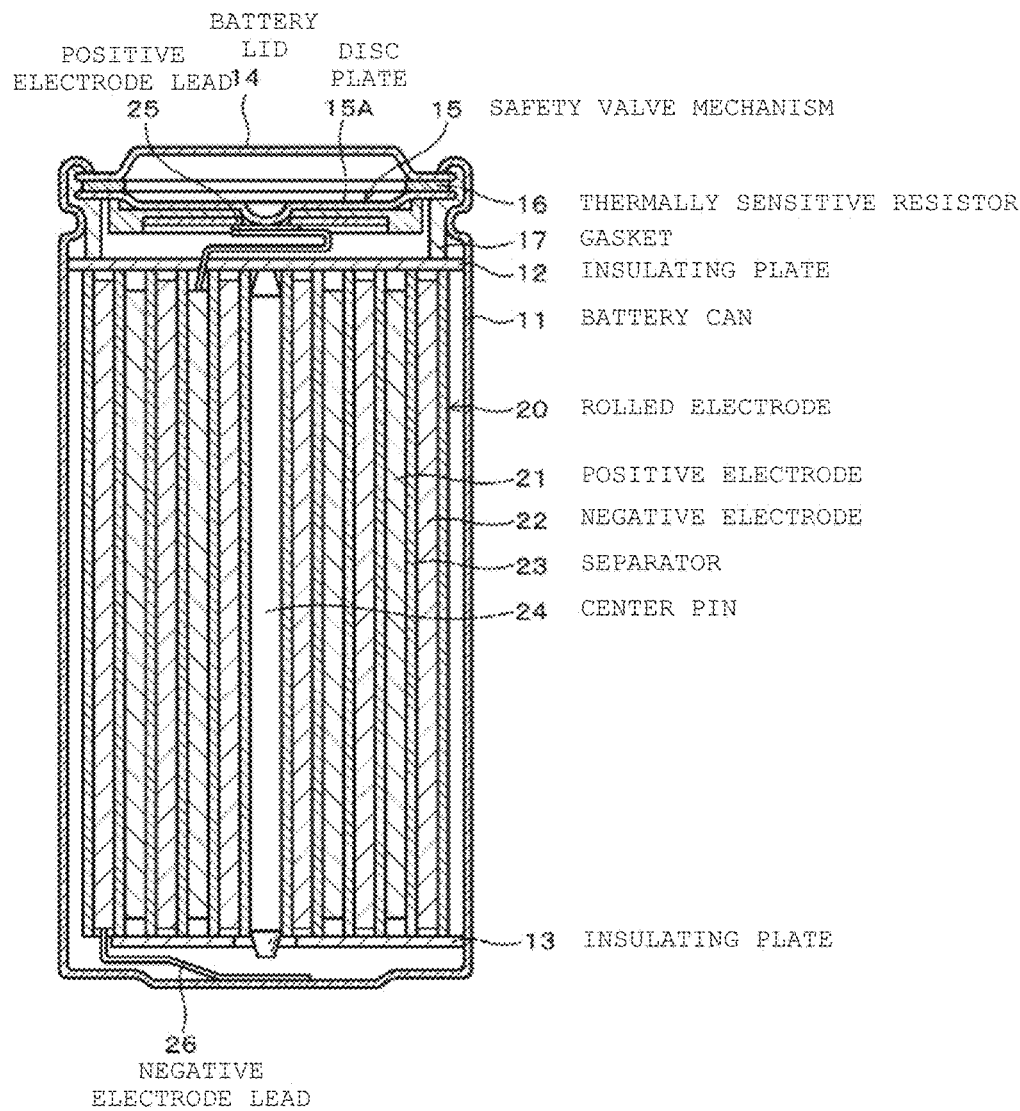
FIG. 1 is a cross-sectional view illustrating an example of a configuration of a non-aqueous electrolyte secondary battery according to an embodiment of the technology disclosed herein.

An exemplified non-aqueous electrolyte secondary battery according a first embodiment of the technology disclosed herein is hereinafter described referring to FIG. 1. This secondary battery may be a generally called, lithium ion secondary battery, in which the capacity of a negative electrode is represented by a capacity component resulting from insertion and extraction of lithium (Li) used as electrode reaction substance. This is a cylindrical secondary battery including a substantially hollow, columnar battery can 11 and a rolled electrode 20 mounted in the can. The rolled electrode 20 is constructed of a band-shaped positive electrode 21 and a band-shaped negative electrode 22 that are paired and rolled in layers with a separator 23 interposed between them. The battery can 11 is made of iron (Fe) plated with nickel (Ni) and has an opening end on one side and a closed end on the other side. An electrolytic solution; an electrolyte in liquid form, is injected into the battery can 11, in which the positive electrode 21, negative electrode 22, and separator 23 are impregnated with this solution. Insulating plates 12 and 13 provided in a pair are disposed at positions across the rolled electrode 20 perpendicularly to its rolled surface.

A battery lid 14, a safety valve mechanism 15 disposed inside of the battery lid 14, and a thermally sensitive resistor (Positive Temperature Coefficient; PTC element) 16 are attached by crimping to the opening end of the battery can 11 with a sealing gasket 17 interposed therebetween. Thus, the battery can 11 is airtightly sealed. The battery lid 14 may be made of a material similar to that of the battery can 11. The safety valve mechanism 15 is electrically connected to the battery lid 14. When the internal pressure of the battery reaches or surpasses a certain level due to internal short circuit or under heat transmitted from outside, a disc plate 15A is reversed so as to disrupt electrical connection between the battery lid 14 and the rolled electrode 20. The sealing gasket 17 may be made of an insulating material and have an asphalt-coated surface.

A center pin 24, for example, is inserted through the rolled electrode 20 at its center. A positive electrode lead 25 made of, for example, aluminum (Al) is connected to the positive electrode 21 of the rolled electrode 20. A negative electrode lead 26 made of, for example, nickel is connected to the negative electrode 22. The positive electrode lead 25 is welded to the safety valve mechanism 15 and is thereby electrically connected to the battery lid 14. The negative electrode lead 26 is welded to and is thereby electrically connected to the battery can 11.

Figure 2:
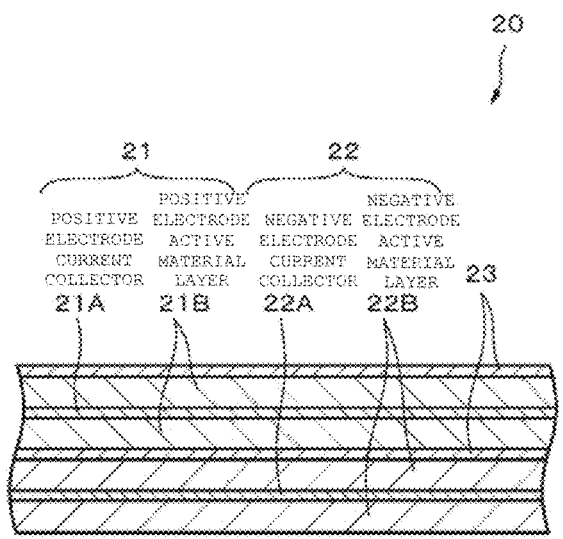
FIG. 2 is a partly enlarged view in cross section of a rolled electrode illustrated in FIG. 1.

The positive electrode 21, negative electrode 22, separator 23, and electrolytic solution constituting the secondary battery are hereinafter described in the mentioned order referring to FIG. 2.

The positive electrode 21 includes, for example, a positive electrode current collector 21A and positive electrode active material layers 21B that are formed on both surfaces of the positive electrode current collector 21A. Though not illustrated in the drawing, the positive electrode current collector 21A may have the positive electrode active material layer 21B on its one surface alone. The positive electrode current collector 21A may include a metallic foil, for example, aluminum foil, nickel foil, or stainless steel foil. The positive electrode active material layer 21B includes, for example, a positive electrode active material that can insert and extract lithium used as electrode reaction substance. The positive electrode active material layer 21B may further include an additive(s), if necessary. The additive may be at least one selected from conductive agents and binders.

Suitable examples of positive electrode materials that can insert and extract lithium may include lithium-containing compounds, for example, lithium oxides, lithium phosphorus oxides, lithium sulfides, and lithium-containing intercalation compounds. The positive electrode material may be a mixture of two or more selected from these compounds. For a higher energy density, the positive electrode material may preferably be a lithium-containing compound including lithium, a transition metal element, and oxygen (O). Examples of such a lithium-containing compound may include a lithium composite oxide having a layered rock-salt structure expressed in the formula (A) and a lithium complex phosphate having an olivine-type structure expressed in the formula (B). Preferably, the lithium-containing compound may include, as the transition metal element, at least one selected from the group consisting of cobalt (Co), nickel, manganese (Mn), and iron. Examples of such a lithium-containing compound may include a lithium composite oxide having a layered rock-salt structure expressed in the formula (C), formula (D), or formula (E), a lithium composite oxide having a spinel-type structure expressed in the formula (F), and a lithium complex phosphate having an olivine-type structure expressed in the formula (G). Specifically, the lithium-containing compound may be $LiNi_{0.50}Co_{0.20}Mn_{0.30}O_2$, $Li_aCoO_2$ ($a\approx1$), $Li_bNiO_2$ ($b\approx1$), $Li_{c1}Ni_{c2}Co_{1-c2}O_2$ ($c1\approx1$, $0<c2<1$), $Li_dMn_2O_4$ ($d\approx1$), or $Li_eFePO_4$ ($e\approx1$).

$$Li_pNi_{(1-q-r)}Mn_qM1_rO_{(2-y)}X_z \qquad (A)$$

(in the formula (A), M1 is at least one of elements selected from the groups 2 to 15 except nickel and manganese, X is at least one of elements selected from the groups 16 and 17 except oxygen, and p, q, y, and z respectively take values in the ranges of $0\leq p\leq 1.5$, $0\leq q\leq 1.0$, $0\leq r\leq 1.0$, $-0.10\leq y\leq 0.20$, and $0\leq z\leq 0.2$).

$$Li_aM2_bPO_4 \qquad (B)$$

(in the formula (B), M2 is at least one of elements selected from the groups 2 to 15, and a and b respectively take values in the ranges of $0\leq a\leq 2.0$ and $0.5\leq b\leq 2.0$).

$$Li_fMn_{(1-g-h)}Ni_gM3_hO_{(2-j)}F_k \qquad (C)$$

(in the formula (C), M3 is at least one selected from the group consisting of cobalt, magnesium (Mg), aluminum, boron (B), titanium (Ti), vanadium (V), chrome (Cr), iron, copper (Cu), zinc (Zn), zirconium (Zr), molybdenum (Mo), tin (Sn), calcium (Ca), strontium (Sr), and tungsten (W), f, g, h, j, and k respectively take values in the ranges of $0.8 \leq f \leq 0 < g < 0.5$, $0 \leq h \leq 0.5$, $g+h<1$, $-0.1 \leq j \leq 0.2$, and $0 \leq k \leq 0.1$, and the composition of lithium differs with a degree of charge and discharge, where f represents a value at full discharge).

$$Li_mNi_{(1-n)}M4_nO_{(2-p)}F_q \quad (D)$$

(in the formula (D), M4 is at least one selected from the group consisting of cobalt, manganese, magnesium, aluminum, boron, titanium, vanadium, chrome, iron, copper, zinc, molybdenum, tin, calcium, strontium, and tungsten, m, n, p, and q respectively take values in the ranges of $8 \leq m \leq 1.2$, $0.005 \leq n \leq 0.5$, $-0.1 \leq p \leq 0.2$, and $0 \leq q \leq 0.1$, and the composition of lithium differs with a degree of charge and discharge, where m represents a value at full discharge).

$$Li_rCo_{(1-s)}M5_sO_{(2-t)}F_u \quad (E)$$

(in the formula (E), M5 is at least one selected from the group consisting of nickel, manganese, magnesium, aluminum, boron, titanium, vanadium, chrome, iron, copper, zinc, molybdenum, tin, calcium, strontium, and tungsten, r, s, t, and u respectively take values in the ranges of $0.8 \leq r \leq 1.2$, $0 \leq s < 0.5$, $-0.1 \leq t \leq 0.2$, and $0 \leq u \leq 0.1$, and the composition of lithium differs with a degree of charge and discharge, where r represents a value at full discharge).

$$Li_vMn_{2-w}M6_wO_xF_y \quad (F)$$

(in the formula (F), M6 is at least one selected from the group consisting of cobalt, nickel, magnesium, aluminum, boron, titanium, vanadium, chrome, iron, copper, zinc, molybdenum, tin, calcium, strontium, and tungsten, v, w, x, and y respectively take values in the ranges of $0.9 \leq v \leq 1.1$, $0 \leq w \leq 0.6$, $3.7 \leq x \leq 4.1$, and $0 \leq y \leq 0.1$, and the composition of lithium differs with a degree of charge and discharge, where v represents a value at full discharge).

$$Li_zM7PO_4 \quad (G)$$

(in the formula (G), M7 is at least one selected from the group consisting of cobalt, manganese, iron, nickel, magnesium, aluminum, boron, titanium, vanadium, niobium (Nb), copper, zinc, molybdenum, calcium, strontium, tungsten, and zirconium, z takes a value in the range of $0.9 \leq z \leq 1.1$, and the composition of lithium differs with a degree of charge and discharge, where z represents a value at full discharge).

Other examples of the Ni-containing lithium composite oxides may include lithium composite oxides (NCM) including lithium, nickel, cobalt, manganese, and oxygen, and lithium composite oxides (NCA) including lithium, nickel, cobalt, aluminum, and oxygen. The Ni-containing lithium composite oxides expressed in the following formulas (H) and (I) may also be used.

$$Li_{v1}Ni_{w1}M1'_{x1}O_{z1} \quad (H)$$

(where, $0<v1<2$, $w1+x1 \leq 1$, $0.2 \leq w1 \leq 1$, $0 \leq x1 \leq 0.7$, $0<z<3$, and M1' is at least one element including a transition metal selected from, for example, cobalt, iron, manganese, copper, zinc, aluminum, chrome, vanadium, titanium, magnesium, and zirconium).

$$Li_{v2}Ni_{w2}M2'_{x2}O_{z2} \quad (I)$$

(where $0<v2<2$, $w2+x2 \leq 1$, $0.65 \leq w2 \leq 1$, $0 \leq x2 \leq 0.35$, $0<z2<3$, and M2' is at least one element including a transition metal selected from, for example, cobalt, iron, manganese, copper, zinc, aluminum, chrome, vanadium, titanium, magnesium, and zirconium).

Other possible examples of the positive electrode materials that can insert and extract lithium may be lithium-free inorganic compounds, for example, $MnO_2$, $V_2O_5$, $V_6O_{13}$, NiS, and MoS.

The positive electrode materials that can insert and extract lithium may be selected from any other suitable materials but the examples mentioned so far. Two or more of the exemplified positive electrode materials mentioned so far may be optionally combined and used.

The binder may be at least one selected from resin materials including polyvinylidene difluoride (PVdF), polytetrafluoroethylene (PTFE), polyacrylonitrile (PAN), styrene-butadiene rubber (SBR), and carboxymethyl cellulose (CMC), and copolymers primarily consisting of any one(s) of these resin materials.

The conductive agent may be one or a mixture of two or more selected from carbon materials including graphite, carbon black, and Ketjen black. The conductive agent may be selected from, other than the carbon materials, any metallic materials having conductivity and high molecular materials having conductivity.

The negative electrode 22 includes, for example, a negative electrode current collector 22A and negative electrode active material layers 22B that are formed on both surfaces of the negative electrode current collector 22A. Though not illustrated in the drawing, the negative electrode current collector 22A may have a negative electrode active material layer 22B on its one surface alone. The negative electrode current collector 22A may include a metallic foil, for example, copper foil, nickel foil, or stainless steel foil.

The negative electrode active material layer 22B includes a binder and one or two or more negative electrode active materials that can insert and extract lithium. If necessary, the negative electrode active material layer 22B may further include an additive(s), for example, a conductive agent.

In this secondary battery, the electrochemical equivalent of the negative electrode 22 or the negative electrode active material may preferably be greater than that of the positive electrode 21 so as to theoretically prevent any lithium metal from being deposited in the negative electrode 22 during the battery charge.

The negative electrode active material is powdered grains of a negative electrode active material. Examples of the negative electrode active material may include carbon materials, for example, non-graphitizing carbons, easily graphitizable carbons, graphite, pyrolytic carbons, cokes, glassy carbons, fired materials of organic high molecular compounds, carbon fibers, and activated carbons. Among these examples, the cokes may include pitch coke, needle coke, and petroleum coke. The fired materials of organic high molecular compounds may refer to high molecular materials, such as phenol resin and furan resin, carbonated by firing at appropriate temperatures. Some of these fired materials may be categorized as non-graphitizing carbons or easily graphitizable carbons. These carbon materials may preferably be used for their remarkable cycle characteristics and outstanding charge and discharge capacities because of few changes in crystalline structure during charge and discharge. The graphite may be particularly preferable for its large electrochemical equivalent and resulting high energy density. The non-graphitizing carbons that excel in cycle characteristics may also be preferably used. Additionally, materials with low charge and discharge potentials, specifically, materials with charge and discharge potentials close to those of lithium metals may also be preferable candidates because such materials may facilitate higher energy density of the battery.

Other examples of the negative electrode active materials that enable a greater capacity may be materials containing, as their constituents, at least one of metal elements and semi-metal elements (for example, alloys, compounds, mixtures). Such materials may lead to a higher energy density. Notably, a higher energy density and remarkable cycle characteristics may be both feasible by using a metal and/or semi-metal element(s) in combination with a carbon material. The technology disclosed herein may use an alloy including two or more metal elements, and may also use an alloy including one or more metal element and one or more semi-metal element. The alloy used may further include a non-metal element(s). In the texture of the alloy may be present a solid solution, a eutectic crystal (eutectic mixture), an intermetallic compound, or two or more of them.

Examples of such a negative electrode active material may include metal elements or semi-metal elements that can form alloys with lithium. Specific examples may include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), and platinum (Pt). These metal or non-metal elements may be either crystalline or amorphous.

The negative electrode active material may preferably include, as its constituent, a metal element or a semi-metal element of the group 4B in the short-form periodic table, and more preferably, at least one of silicon and tin. The silicon and tin may be particularly preferable because they excel in lithium insertion-extraction ability and accordingly attain a high energy density. For example, the negative electrode active material may include, in at least part thereof, silicone alone or a silicon-based alloy or compound, tin alone or a tin-based alloy or compound, or one or two or more phases of these materials.

The silicon-based alloy may include, as a secondary constituent other than silicon, at least one selected from the group consisting of tin, nickel, copper, iron, cobalt, manganese, zinc, indium, silver, titanium, germanium, bismuth, antimony (Sb), and chrome. The tin-based alloy may include, as a secondary constituent other than tin, at least one selected from the group consisting of silicon, nickel, copper, iron, cobalt, manganese, zinc, indium, silver, titanium, germanium, bismuth, antimony, and chrome.

The tin- or silicon-based compound may be a compound including oxygen or carbon and further including the secondary constituent in addition to tin or silicon.

A particularly preferable example of the Sn-based negative electrode active material may be a SnCoC-containing material including, as its constituents, cobalt, tin, and carbon, in which the content of carbon is between 9.9 mass % and 29.7 mass %, and the ratio of cobalt to the sum of tin and cobalt is between 30 mass % and 70 mass %. Such a composition may allow a high energy density and remarkable cycle characteristics to be both achieved at the same time.

If necessary, the SnCoC-containing material may further include an additional element as its constituent. Preferable examples of the additional element may include silicon, iron, nickel, chrome, indium, niobium, germanium, titanium, molybdenum, aluminum, phosphor (P), gallium, and bismuth. Optionally, two or more of these substances may be combined and used. Such an additional element may further improve the capacity and cycle characteristics.

Preferably, the SnCoC-containing material may have a phase including tin, cobalt, and carbon, and the phase has a low-crystalline structure or an amorphous structure. In the SnCoC-containing material, a constituent, carbon, may preferably be bonded at least in part to the other constituent; metal element or semi-metal element. While aggregation or crystallization of, for example, tin may be a factor that degrades the cycle characteristics, such an undesired event may be prevented when carbon is bonded to the other constituent.

The state of bonding between the elements may be measured and checked by, for example, X-ray photoelectron spectroscopy (XPS). In the XPS using an energy-calibrated apparatus that obtains the 4f orbital peak of a gold atom (Au4f) at 84.0 eV, the is orbital peak of carbon (C1s), for example, graphite, may appear at 284.5 eV. This peak may appear at 284.8 eV with a surface contaminating carbon. When carbon is bonded to the metal element or semi-metal element at a higher charge density of the carbon element, the C1s peak may appear in a range below 284.5 eV. When the peak of an associated wave of C1s obtained for the SnCoC-containing material appears in a range below 284.5 eV, carbon included in the SnCoC-containing material may be, at least in part, bonded to the other element; metal element or semi-metal element.

The XPS measurement may use the C1s peak to correct an energy axis of a spectrum. Due to the fact that the surface typically has surface contaminating carbon, the C1s peak of the surface-contaminating carbon is set to 284.8 eV, which is used as an energy reference. In the XPS measurement, the C1s peak waveform takes a form including peaks of the surface-contaminating carbon and of carbon in the SnCoC-containing material. The waveform is analyzed with a commercially available software to separate the peak of the surface-contaminating carbon from the peak of carbon in the SnCoC-containing material. To analyze the waveform, the position of a main peak present in the vicinity of a minimum binding energy is defined as the energy reference (284.8 eV).

Other negative electrode active materials may be selected from metal oxides and high molecular compounds that can insert and extract lithium. Examples of the metal oxides may include oxides containing titanium and lithium, for example, lithium titanate ($Li_4Ti_5O_{12}$), iron oxides, ruthenium oxides, and molybdenum oxides. Examples of the high molecular compounds may include polyacetylene, polyaniline, and polypyrrole.

The binder has a three-dimensional reticulated structure (hereinafter, simply referred to as "reticulated" or "reticulated structure") in which the reticulated structure is so present that fills spaces between the negative electrode active material grains and between the negative electrode active material grains and negative electrode current collector 22A (see FIG. 8A). Specifically, the binder is so spread as to cast a net over the spaces between the negative electrode active material grains and between the negative electrode active material grains and negative electrode current collector 22A. The binder according to the first embodiment is thus structurally distinct from the conventional binders that cover surfaces of the negative electrode active material grains.

The binder having the reticulated structure may be present in part of whole voids in the negative electrode active material layer 22B, or may be present in whole or substantially whole voids in the negative electrode active material layer 22B. For a better peel strength, the binder may preferably be present in all of or substantially all of the voids. The "voids" described herein refer to spaces between the negative electrode active material grains and between the negative electrode active material grains and the negative electrode current collector 22A.

The binder includes a first binder and a second binder. The first binder includes at least one of carboxyalkyl cellulose; water-soluble binder, and a metallic salt thereof. The second binder includes at least one of a styrene butadiene rubber (hereinafter, "SBR"); rubber-based binder, and a derivative thereof. While the binder described in the first embodiment includes the first and second binders, the binder is not necessarily limited to such a composition and may be selected from any other binders that can be reticulated.

The carboxyalkyl cellulose may include, for example, at least one of carboxymethyl cellulose (hereinafter, "CMC"), carboxypropyl methyl cellulose, carboxypropyl cellulose, carboxyethyl cellulose, hydroxypropyl methyl cellulose, and hydroxypropyl ethyl cellulose. The metal included in the metallic salt of carboxyalkyl cellulose may include, for example, at least one of Li, Na, K, Rb, Cs, Mg, and Ba.

The SBR may include, in its molecules, any other component but styrene and butadiene. For example, the SBR may include, in its molecules, at least one of isoprene and chloroprene.

For a better peel strength, the binder's reticulated structure may preferably have an average pore size of 5 nm to 5 µm, more preferably 100 nm to 5 µm, and even more preferably 1 µm to 3 µm.

The average pore size of the binder's reticulated structure may be calculated as described below. The negative electrode 22 is cut out in cross section by, for example, FIB (Focused Ion Beam) machining, and an image of the cross-sectional surface is obtained with a scanning electron microscope (hereinafter "SEM"). The magnifying power of the SEM image then is decided so that the average pore size is large enough. Next, five pores are randomly selected from the obtained cross-sectional SEM image, and the largest width of each pore in direct distance is set as its pore size. Then, a simple average value (arithmetic mean) of the measured five pore sizes is calculated and used as the average pore size.

For a better peel strength, the mass ratio of the first binder to the second binder (first binder:second binder) may preferably be in the range of 1:99 to 90:10, more preferably in the range of 1:99 to 40:60, and even more preferably in the range of 20:80 to 30:70. These ranges of mass ratios each include an upper-limit value and a lower-limit value.

The mass ratio of the first binder to the second binder may be calculated by thermogravimetry (TG). Specifically, the mass ratio may be obtained by the thermogravimetry through inverse calculation of a decrease in weight between 300° C. and 390° C.

The mass ratio of the binder included in the negative electrode active material layer 22B to the negative electrode active material grains (binder:negative electrode active material grains) may preferably be in the range of 20:80 to 0.5:99.5, more preferably in the range of 20:80 to 1:99, and even more preferably in the range of 15:85 to 1:99. These ranges of mass ratios each include an upper-limit value and a lower-limit value. The binder added in a greater amount than the mass ratio of 20:80 may involve risks of a higher internal resistance of the battery and resulting in poor output characteristics. On the other hand, the binder added in a smaller amount than the mass ratio of 0.5:99.5 may undercut close contact between the negative electrode active material grains and between the negative electrode active material grains and the negative electrode current collector 22A.

The mass ratio of the binder to the negative electrode active material grains may be calculated by thermogravimetry (TG).

With the object of improving the peel strength, the first binder in an aqueous solution containing 1 mass % of the first binder may preferably have a viscosity of 10 mPa·s to 18,000 mPa·s, more preferably 100 Pa·s to 4,000 Pa·s, and even more preferably 1,000 Pa·s to 4,000 mPa·s.

The viscosity of the first binder may be calculated as described below. First, an aqueous solution containing 1 mass % of CMC (weak solution) is prepared. Next, the viscosity of the aqueous solution at 25° C. is measured with a B-type viscometer. The viscosity measurement of the first binder using the B-type viscometer is specifically described below. First, an optional rotor for measurement is selected, and a container for sample measurement is then selected. Next, a standard solution used to calibrate the viscometer is injected in a certain amount and measured using the prepared rotor and measurement container. Then, torques are measured, with the number of rotations being variously changed. The standard solution temperature and ambient temperature during the measurement are both set to 25° C. A point is defined at which a certain shear rate is obtained to decide an apparatus constant. Next, an aqueous solution is prepared in which 1 mass % of the first binder is dissolved. The prepared aqueous solution is left at rest for 24 hours at 25° C. and subjected to measurement using the same B-type viscometer and measurement container. Then, torques are measured, with the number of rotations being variously changed, to obtain a torque at the same shear rate when the apparatus constant was decided for the standard solution. This torque is then multiplied by the apparatus constant to decide the viscosity of the first binder.

For a better peel strength, the second binder may preferably have an average grain size of 80 nm to 500 nm, and more preferably 100 nm to 200 nm.

When the second binder is prepared in the form of a dispersion, the average grain size may be calculated with a fiber optic dynamic light scattering spectrometer (FDLS-3000) supplied by Otsuka Electronics Co., Ltd. In the measurement is used a solution containing the second binder at a dilute concentration of 0.01 mass % to 1 mass %. When the second binder is included in the negative electrode active material layer 22B, the average grain size of the second binder may be obtained as follows; the second binder is stained with osmium and observed with the SEM, and an average value (arithmetic mean) of diameters of optional 10 grains in an obtained image are calculated. The osmium staining may be done as follows. First, osmium tetroxide and the negative electrode 22 are kept in an air-tightly sealed box (50° C., six hours). Next, ruthenium tetroxide is dyed (room temperature, two hours). Then, cushion polishing is performed (5 kV, eight hours). The following is the name of an SEM apparatus used and conditions set for measurement. FE-SEM Hitachi, S-4800 (accelerating voltage: 2 kV), reflected electron image The peel strength between the negative electrode active material layer 22B and the negative electrode current collector 22A may preferably be between 0.1 mN/mm and 80 mN/mm. The peel strength weaker than 0.1 mN/mm may pose the risk of cycle characteristics being degraded. The peel strength exceeding 80 mN/mm may result in a greater internal resistance of the battery due to overabundance of the binder in the negative electrode active material layer 22B. The peel strength is measured pursuant to iso29862:2007 (JIS Z 0237).

The conductive agent may be selected from carbon materials similar to the ones mentioned in the description of the positive electrode active material layer 21B.

The separator 23 serves to separate the positive electrode 21 and the negative electrode 22 not to contact each other in order to avoid possible short circuit of electric current and to allow passage of lithium ions. The separator 23 may include a porous film made of a resin, for example, polytetrafluoroethylene, polypropylene, or polyethylene, or may be a laminate of porous films made of two or more of these resins. A polyolefin-made porous film may be particularly preferable for its outstanding short circuit preventive effect and shut-down effect that provide better safety of the battery. Among the resins possibly used, polyethylene may be a material preferably used for the separator 23 on account of its shut-down effect at temperatures between 100° C. and 160° C. and remarkable electrochemical stability. Other resins having electrochemical stability that can be used may include materials copolymerized or blended with polyethylene or polypropylene. The porous film may be a laminate of three or more layers including a polypropylene layer, a polyethylene layer, and a polypropylene layer.

The separator 23 may include a medium and a surface layer(s) formed on one surface or both surfaces of the medium. The surface layer may include inorganic grains having electrical insulating properties and a resin material that binds the inorganic grains to the medium surface and also to one another. The resin material may be fibrillated to provide a three-dimensional reticulated structure in which fibrils are continuous and interconnected. The inorganic grains may remain unlinked and dispersed by being supported by the resin material having such a three-dimensional reticulated structure. The inorganic grains may be bound to the medium surface and to one another without fibrillating the resin material. In this instance, an improved binding strength may be obtained. Providing the surface layer(s) on one surface or both surfaces of the medium may impart oxidation resistance, heat resistance, and mechanical strength to the medium.

The medium is a porous film. The medium is specifically a porous film having remarkable ion permeability, insulating properties, and a predetermined mechanical strength. An electrolytic solution is retained in voids of the medium. Properties required of the medium may preferably include a predetermined mechanical strength as the separator's principal part, resistance to the electrolytic solution, poor reactivity and expansibility.

Preferable examples of the resin material constituting the medium may include polyolefin resins including polypropylene and polyethylene, acrylic resins, styrene resins, polyester resins, and nylon resins. In particular, low-density polyethylene, high-density polyethylene, linear polyethylene, low molecular waxes thereof, and polyolefin resins including polypropylene, for example, may be suitable candidates on account of their appropriate melting temperatures and accessibility. The porous film may be a laminate of porous films made of two or more of these resins or a porous film formed by melting and kneading two or more of these resins. The medium including a porous film made of a polyolefin resin may excel in separability between the positive electrode 21 and the negative electrode 22, effectively reducing the risk of internal short circuit.

The medium may be a non-woven fabric. Examples of fiber constituting the non-woven fabric may include aramid fiber, glass fiber, polyolefin fiber, polyethylene terephthalate (PET) fiber, and nylon fiber. The non-woven fabric may be obtained by blending two or more of these different types of fiber.

The inorganic grains include at least one of a metallic oxide, a metallic nitride, a metallic carbide, and a metallic sulfide. Suitable examples of the metallic oxide may include aluminum oxide (alumina, $Al_2O_3$), boehmite (hydrate aluminum oxide), magnesium oxide (magnesia, MgO), titanium oxide (titania, $TiO_2$), zirconium oxide (zirconia, $ZrO_2$), silicon oxide (silica, $SiO_2$), and yttrium oxide (yttria, $Y_2O_3$). Suitable examples of the metallic nitride may include silicon nitride ($Si_3N_4$), aluminum nitride (AlN), boron nitride (BN), and titanium nitride (TiN). Suitable examples of the metallic carbide may include silicon carbide (SiC) and boron carbide (B4C). Suitable examples of the metallic sulfide may include barium sulfide ($BaSO_4$). Other examples may include minerals including porous aluminosilicate such as zeolite ($M_{2/n}O \cdot Al_2O_3 \cdot xSiO_2 \cdot yH_2O$, where M is a metallic element, $x \geq 2$, $y \geq 0$), layered silicate, barium titanate ($BaTiO_3$), and strontium titanate ($SrTiO_3$). Especially, alumina, titania (of, preferably, rutile structure), silica, or magnesia may preferably be used, of which alumina is particularly preferable. The inorganic grains have oxidation resistance and heat resistance. The surface layer including the inorganic grains on a side surface opposite to the positive electrode has a high resistance to oxidative ambient in the vicinity of the positive electrode during the battery charge. The shape of the inorganic grain is not particularly limited. The inorganic grains may have a spherical, flat, fibrous, or cubic shape, or may be randomly shaped.

Examples of the resin material constituting the surface layer may include resins that excel in heat resistance, of which at least one of a melting point and a glass transition temperature is higher than or equal to 180° C. Specific examples of such a resin may include: fluorine-containing resins, for example, polyvinylidene fluoride and polytetrafluoroethylene; fluorine-containing rubbers, for example, vinylidene fluoride-tetrafluoroethylene copolymers and ethylene-tetrafluoroethylene copolymers; rubbers, for example, styrene-butadiene copolymers and hydrides thereof, acrylonitrile-butadiene copolymers and hydrides thereof, acrylonitrile-butadiene-styrene copolymers and hydrides thereof, methacrylate ester-acrylate copolymers, styrene-acrylate copolymers, acrylonitrile-acrylate copolymers, ethylene propylene rubber, polyvinyl alcohol, and polyvinyl acetate; cellulose derivatives, for example, ethyl cellulose, methyl cellulose, hydroxyethyl cellulose, and carboxymethyl cellulose; polyphenylene ether; polysulfone; polyether sulfone; polyphenylene sulfide; polyether imide; polyimide; polyamides including wholly aromatic polyamide (aramid); polyamide-imide; polyacrylonitrile; polyvinyl alcohol; polyether; acrylic resins; and polyester. Any one of these resins may be singly used, or two or more of them may be combined and used. Among the mentioned resins, a fluorine-containing resin such as polyvinylidene fluoride may preferably be used in view of oxidation resistance and flexibility, and aramid or polyamide-imide may preferably be used in view of heat resistance.

The inorganic grain may preferably have a grain size between 1 nm and 10 μm. The inorganic grains of 1 nm or less in grain size may be hardly available. Such inorganic grains, even if available, may be too costly. The grain size of 10 μm or more in grain size may increase an inter-electrode distance. Then, a sufficient fill volume of the active material within a limited space may not be possible, leading to a poor battery capacity.

The surface layer may be formed as follows; a slurry including a matrix resin, a solvent, and an inorganic material is applied onto the medium (porous film), passed through a poor solvent of the matrix resin and a solvent-philic bath of the solvent for phase separation, and then dried.

The inorganic grains described above may be included in the porous film used as medium. The surface layer may be made of a resin material alone without the inorganic grains.

The separator 23 is impregnated with an electrolytic solution which is an electrolyte prepared in liquid form. The electrolytic solution includes a solvent and an electrolyte salt dissolved in the solvent. The electrolytic solution may include a known additive to improve the battery properties.

The solvent may preferably be cyclic carbonic ester, for example, ethylene carbonate or propylene carbonate. One of ethylene carbonate and propylene carbonate may be singly used, or both of them may be combined and used. This may provide improved cycle characteristics.

The solvent may preferably be a mixture of the cyclic carbonic ester and chained carbonic ester, for example, diethyl carbonate, dimethyl carbonate, ethylmethyl carbonate, or methylpropyl carbonate. This may provide improved ion conductivity.

The solvent may preferably further include 2,4-difluoroanisole or vinylene carbonate. Adding either one of these substances may be preferable because 2,4-difluoroanisole may provide an improved discharge capacity, and vinylene carbonate may provide improved cycle characteristics. Combined use of these two materials may be further preferable because the discharge capacity and cycle characteristics may be both improved.

Other examples of the solvent may include butylene carbonate, γ-butyrolactone, γ-valerolactone, 1,2-dimethoxyethane, tetrahydrofuran, 2-methyl tetrahydrofuran, 1,3-dioxolan, 4-methyl-1,3-dioxolan, methyl acetate, methyl propionate, acetonitrile, glutaronitrile, adiponitrile, methoxyacetonitrile, 3-methoxy propionitrile, N,N-dimethyl formamide, N-methyl pyrrolidinone, N-methyl oxazolidinone, N,N-dimethyl imidazolidinone, nitromethane, nitroethane, sulfolane, dimethyl sulfoxide, and trimethyl phosphate.

A compound obtained by substituting at least part of hydrogen in such a non-aqueous solvent with fluorine is also a possible candidate because such a compound may be expected to improve the reversibility of electrode reactions when certain types of electrodes are combined.

An example of the electrolyte salt may be a lithium salt. An electrolyte salt may be singly used, or two or more different electrolyte salts may be combined and used. Examples of the lithium salt may include, $LiPF_6$, $LiBF_4$, $LiAsF_6$, $LiClO_4$, $LiB(C_6Fi_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, difluoro[oxalato-O,O']lithium borate, lithium bis(oxalato)borate, and LiBr. Among these examples, $LiPF_6$ that may provide higher ion conductivity and improved cycle characteristics may preferably be used.

In a secondary battery according to a second embodiment, an open circuit voltage at full charge for a pair of positive electrode 21 and negative electrode 22 (i.e., battery voltage) may be 4.2 V or less. The open circuit voltage may preferably be 4.25 V or higher voltages, more preferably 4.3 V or higher voltages, and even more preferably 4.4 V or higher voltages. A higher energy density may be feasible with a higher battery voltage. The upper-limit value of the open circuit voltage at full charge for a pair of positive electrode 21 and negative electrode 22 may preferably be 6.00 V, more preferably 4.60 V, and even more preferably 4.50 V.

When the secondary battery thus configured is electrically charged, for example, lithium ions are extracted from the positive electrode active material layer 21B and inserted through the electrolytic solution into the negative electrode active material layer 22B. When the secondary battery is electrically discharged, for example, lithium ions are extracted from the negative electrode active material layer 22B and inserted through the electrolytic solution into the positive electrode active material layer 21B.

A manufacturing method for the battery according to the first embodiment of the technology disclosed herein is hereinafter described.

The positive electrode is produced as described below. First, the positive electrode active material, conductive agent, and binder are mixed to prepare a compound for positive electrode. This positive electrode compound is dispersed in a solvent, for example, N-methyl-2-pyrolidone (NMP) to prepare a pasty slurry of the positive electrode compound. Next, the prepared slurry is applied to and dried on the positive electrode current collector 21A, and then compressed by, for example, a roll pressing machine into the positive electrode active material layer 21B to form the positive electrode 21.

The negative electrode 22 is produced according to one of first and second production processes described below. The production of the negative electrode is not necessarily limited to the first or second production process. The negative electrode may be produced otherwise insofar as the binder is reticulated.

First, the negative electrode active material, first binder, and second binder are mixed to prepare a compound for negative electrode. This negative electrode compound is dispersed in water used as solvent to prepare a pasty slurry of the negative electrode compound. Next, the prepared slurry of the negative electrode compound is injected with gas bubbles and then applied under ultrasonic wave to the negative electrode current collector 22A.

A gas used to form the gas bubbles may include at least one of nitrogen, oxygen, argon, hydrogen, helium, air, carbonic acid gas, acetylene, propane, and carbon dioxide. Carbon dioxide may be used in solid state (i.e., dry ice). The frequency of ultrasonic wave may be between 20 kHz and 3 mHz.

The pore size of the reticulated structure finally obtained may be controlled by adjusting and setting the size of gas bubbles included in the slurry of the negative electrode compound. The size of gas bubbles is changeable with different frequencies of ultrasonic wave and may become smaller with a higher frequency. The pore size of the reticulated structure may be controlled by adjusting the viscosity of the slurry through changes of the molecular weight of the first binder and the amount of water used. A range of pore sizes controllable by adjusting the slurry viscosity may be narrower than a range of pore sizes controllable by adjusting the size of gas bubbles. Preferably, the pore size control may be mostly done by changing the gas bubble size and assisted by the slurry viscosity.

The applied slurry of the negative electrode compound including gas bubbles is dried to form the negative electrode active material layer 22B including the reticulated binder on the negative electrode current collector 22A. The negative electrode active material layer 22B is compressed by, for example, a roll pressing machine to form the negative electrode 22.

Similarly to the first production process, the second production process starts with preparation of the pasty slurry of the negative electrode compound. Next, the prepared slurry of the negative electrode compound is applied to the negative electrode current collector 22A, quickly frozen, and dried under vacuum. As a result, the negative electrode active material layer 22B including the reticulated binder is formed on the negative electrode current collector 22A. The negative electrode active material layer 22B is compressed by, for example, a roll pressing machine to form the negative electrode 22.

The temperature for quick freezing may be between −80° C. and −20° C. The degree of vacuum for drying may be 20 torr or less. The pore size of the reticulated structure may be controlled by adjusting the amount of water added to the slurry of the negative electrode compound. The slurry of the negative electrode compound has a lower viscosity with more water, resulting in larger gas bubbles. This increases the pore size of the reticulated structure finally obtained. The pore size control to a certain extent is possible through adjustment of the molecular weight (viscosity) or the degree of etherification of the first binder.

The positive electrode lead 25 is attached by, for example, welding to the positive electrode current collector 21A, and the negative electrode lead 26 is also attached by, for example, welding to the negative electrode current collector 22A. Then, the positive electrode 21 and the negative electrode 22 are wound in a roll with the separator 23 interposed therebetween. An edge of the positive electrode lead 25 is welded to the safety valve mechanism 15, while an edge of the negative electrode lead 26 is welded to the battery can 11. Then, a roll of the positive and negative electrodes 21 and 22 is held between the paired insulating plates 12 and 13, and then contained in the battery can 11. After the positive electrode 21 and the negative electrode 22 are contained in the battery can 11, the electrolytic solution is injected into the battery can 11, and the separator 23 is impregnated with the injected electrolytic solution. Then, the battery lid 14, safety valve mechanism 15, and thermally sensitive resistor 16 are fixed by crimping to the opening end of the battery can 11 with the sealing gasket 17 interposed therebetween. As a result, the battery illustrated in FIG. 1 is obtained.

In the secondary battery according to the first embodiment, the reticulated structure of the binder included in the negative electrode active material layer 22B may allow the electrolytic solution to easily penetrate into the binder. This may suppress the risk of ion conduction being inhibited by the binder and may accordingly prevent increase of the internal resistance of the battery. Therefore, battery properties including charge-and-discharge efficiency, capacity, and output characteristics may be successfully improved.

The binder's reticulated structure is so present as to fill spaces between the negative electrode active material grains and spaces between the negative electrode active material grains and the negative electrode current collector 22A. Therefore, the negative electrode active material grains may be bound to one another and to the negative electrode current collector 22A through surface contact (extensive range of grain surfaces) instead of point contact (local part of grain surfaces). This may ensure closer contact between the negative electrode active material grains and between the negative electrode active material grains and the negative electrode current collector 22A, offering an improved peel strength between the negative electrode active material grains and between the negative electrode active material grains and the negative electrode current collector 22A.

It is being pursued in recent years to achieve a higher volume density of the negative electrode active material layer. A higher volume density is thus pursued to increase the capacity of the negative electrode active material layer per volume and eventually achieve a greater capacity of the secondary battery per volume. Another recent approach for developing a smaller secondary battery with a greater capacity is to use, as negative electrode active material, silicons that allow greater charge and discharge capacities than carbon-based materials, silicon compounds, silicon-carbon mixtures, and silicon compound-carbon mixtures. In silicons and silicon compounds, however, the active materials used therein are more variable in volume during charge and discharge than in carbon materials. This may weaken degrees of contact during an ongoing cycle between the negative electrode active material grains and between the negative electrode active material grains and the negative electrode current collector, leading to poor cycle characteristics. When such a silicon-based negative electrode active material is used in the battery according to the first embodiment, the reticulated binder included in the negative electrode active material layer 22B may serve to prevent decline of degrees of contact during an ongoing cycle between the negative electrode active material grains and between the negative electrode active material grains and the negative electrode current collector 22A. Thus, possible degradation of the cycle characteristics may be prevented with the silicon-based negative electrode active materials.

Figure 3:
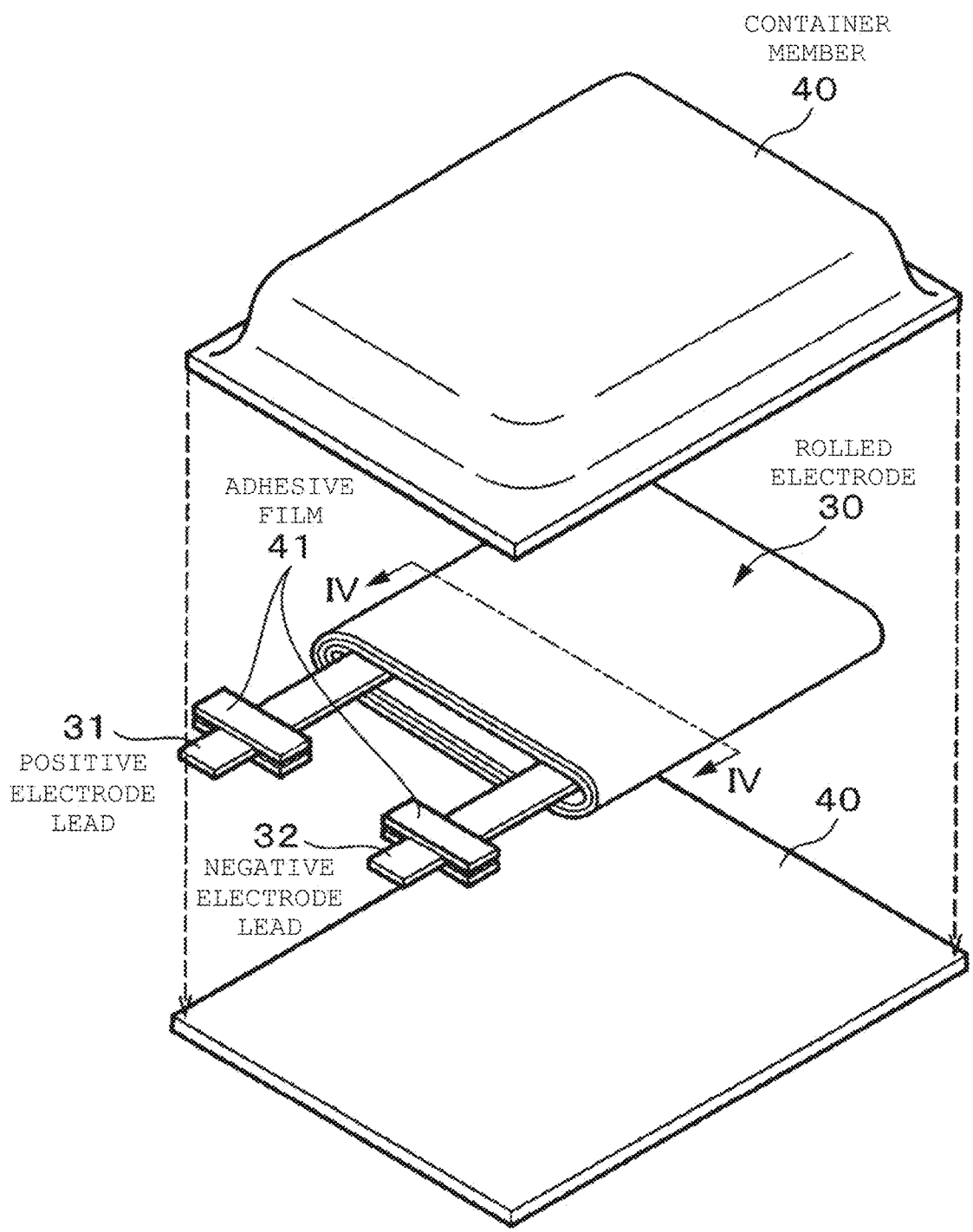
FIG. 3 is an exploded perspective view illustrating an example of a configuration of a non-aqueous electrolyte secondary battery according to an embodiment of the technology disclosed herein.

FIG. 3 is an exploded perspective view of a non-aqueous electrolyte secondary battery according to a second embodiment of the technology disclosed herein. This is often called a flat or angular secondary battery, in which a rolled electrode 30 mounted with a positive electrode lead 31 and a negative electrode lead 32 is contained Ln a film-shaped container member 40. This secondary battery thus structured may be reduced in size, weight, and thickness.

The positive electrode lead 31 and the negative electrode lead 32 are extended outward in, for example, the same direction from the inside of the container member 40. The positive electrode lead 31 and the negative electrode lead 32 are made of a metallic material, for example, aluminum, copper, nickel, or stainless steel. These electrode leads are formed in a thin, flat shape or in a net-like shape.

The container member 40 includes, for example, a rectangular, aluminum laminate film including a nylon film, an aluminum foil, and a polyethylene film in the mentioned order. The container member 40 is disposed so as to have its polyethylene-film side and the rolled electrode 30 face each other. The outer peripheral edges of the container member 40 are closely adhered by welding or with an adhesive. An adhesive film 41 is interposed between the container member 40 and the positive and negative electrode leads 31 and 32 so as to block outside air. The adhesive film 41 is made of a material adherable to the positive electrode lead 31 and the negative electrode lead 32, for example, one selected from polyolefin resins including polyethylene, polypropylene, modified polyethylene, and modified polypropylene.

Instead of the aluminum laminate film described earlier, the container member 40 may include a laminate film structured otherwise, a high molecular film made of polypropylene, or a metallic film. The container member 40 may include a laminate film having a high molecular film(s) formed on one surface or both surfaces of an aluminum film used as core.

Figure 4:
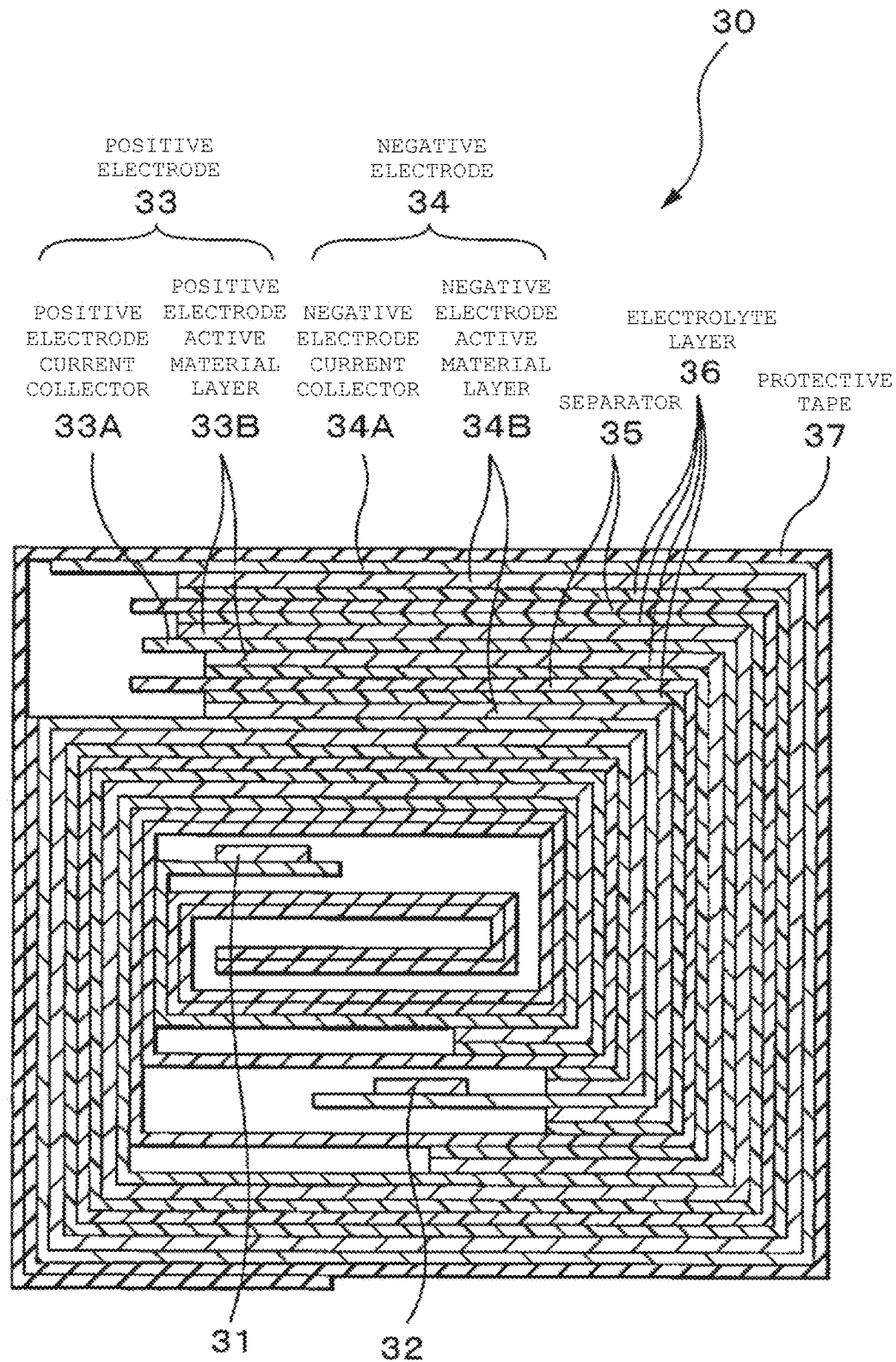
FIG. 4 is a cross-sectional view of the rolled electrode illustrated in FIG. 3 along IV-IV line.

FIG. 4 is a cross-sectional view of the rolled electrode 30 illustrated in FIG. 3 along IV-IV line. In the rolled electrode 30, a positive electrode 33 and a negative electrode 34 are would in a roll with a separator 35 and an electrolyte layer 36 interposed between these electrodes. The outermost peripheral part of the rolled electrode 30 is protected with a protective tape 37.

The positive electrode 33 includes, for example, a positive electrode current collector 33A and a positive electrode active material layer(s) 33B formed on one surface or both surfaces of the current collector 33A. The negative electrode 34 includes, for example, a negative electrode current collector 34A and a negative electrode active material layer(s) 34B formed on one surface or both surfaces of the current collector 34A. The negative electrode active material layer 34B and the positive electrode active material layer 33B are positioned opposite to each other. The positive electrode current collector 33A, positive electrode active material layer 33B, negative electrode current collector 34A, negative electrode active material layer 34B, and separator 35 are configured similarly to the positive electrode current collector 21A, positive electrode active material layer 21B, negative electrode current collector 22A, negative electrode active material layer 22B, and separator 23 according to the first embodiment.

The electrolyte layer 36 is a gelatinous layer including an electrolytic solution and a high molecular compound serving to retain the electrolytic solution. The gelatinous electrolyte layer 36 may preferably be used because it may provide high ion conductivity and prevent leakage from the battery. The electrolytic solution is the same as the electrolytic solution according to the first embodiment. Examples of the high molecular compound may include polyacrylonitrile, polyvinylidene fluoride, vinylidene fluoride-hexafluoropropylene copolymers, polytetrafluoroethylene, polyhexafluoropropylene, polyethylene oxides, polypropylene oxides, polyphosphazene, polysiloxane, polyvinyl acetate, polyvinyl alcohol, methyl polymethacrylate, polyacrylate, polymethacrylate, styrene-butadiene rubbers, nitrile-butadiene rubbers, polystylene, and polycarbonate. Among the mentioned examples, polyacrylonitrile, polyvinylidene fluoride, polyhexafluoropropylene, and polyethylene oxides are particularly preferable in view of electrochemical stability.

The gelatinous electrolyte layer 36 may include an inorganic material similar to the inorganic material described in reference to the resin layer of the separator 23 according to the second embodiment. Adding such an inorganic material may improve heat resistance. The electrolyte layer 36 may be replaced with an electrolytic solution.

A manufacturing method for the secondary battery according to the second embodiment of the technology disclosed herein is hereinafter described.

First, a precursor solution including a solvent, electrolyte salt, a high molecular compound, and a mixed solvent is applied to the positive electrode 33 and the negative electrode 34, and the mixed solvent is volatilized to form the electrolyte layer 36. The positive electrode lead 31 is attached by welding to an end of the positive electrode current collector 33A, and the negative electrode lead 32 is attached by welding to an end of the negative electrode current collector 34A. Next, the positive electrode 33 and the negative electrode 34 respectively having the electrolyte layers 36 formed thereon are stacked in layers with the separator 35 interposed therebetween, and then longitudinally wound in a roll. Then, the protective tape 37 is adhered to the outermost peripheral part of this roll to form the rolled electrode 30. Lastly, the rolled electrode 30 is inserted and held in the container member 40, and outer peripheral edges of the container member 40 are thermally welded and sealed. Before sealing, the adhesive film 41 is inserted between the container member 40 and the positive and negative electrode leads 31 and 32. As a result, the secondary battery illustrated in FIG. 4 is obtained.

This secondary battery may be manufactured otherwise, as described below. First, the positive electrode 33 and the negative electrode 34 are produced as described earlier, and the positive electrode lead 31 and the negative electrode lead 32 are respectively attached to the positive electrode 33 and the negative electrode 34. Next, the positive electrode 33 and the negative electrode 34 are stacked in layers with the separator 35 interposed therebetween, and then wound in a roll. Then, the protective tape 37 is adhered to the outermost peripheral part of this roll to obtain a rolled body. This rolled body is inserted and held in the container member 40, and outer peripheral edges of the container member 40, except one on its one side, are thermally welded so as to house the rolled body in the bag-shaped container member 40. Then, a composition for electrolyte is prepared that includes a solvent, an electrolyte salt, a monomer which is the raw material of a high molecular compound, a polymerization initiator, and, if necessary, any other required material such as a polymerization inhibitor. This composition is injected into the container member 40.

After the electrolyte composition is injected into the container member 40, the cavity of the container member 40 is thermally welded and sealed in vacuum atmosphere. Then, the monomer is polymerized under heat into the high molecular compound to form the gelatinous electrolyte layer 36. As a result, the secondary battery illustrated in FIG. 4 is obtained.

The exemplified application 1 describes a battery pack and an electronic device equipped with the battery according to the first or second embodiment.

Figure 5:
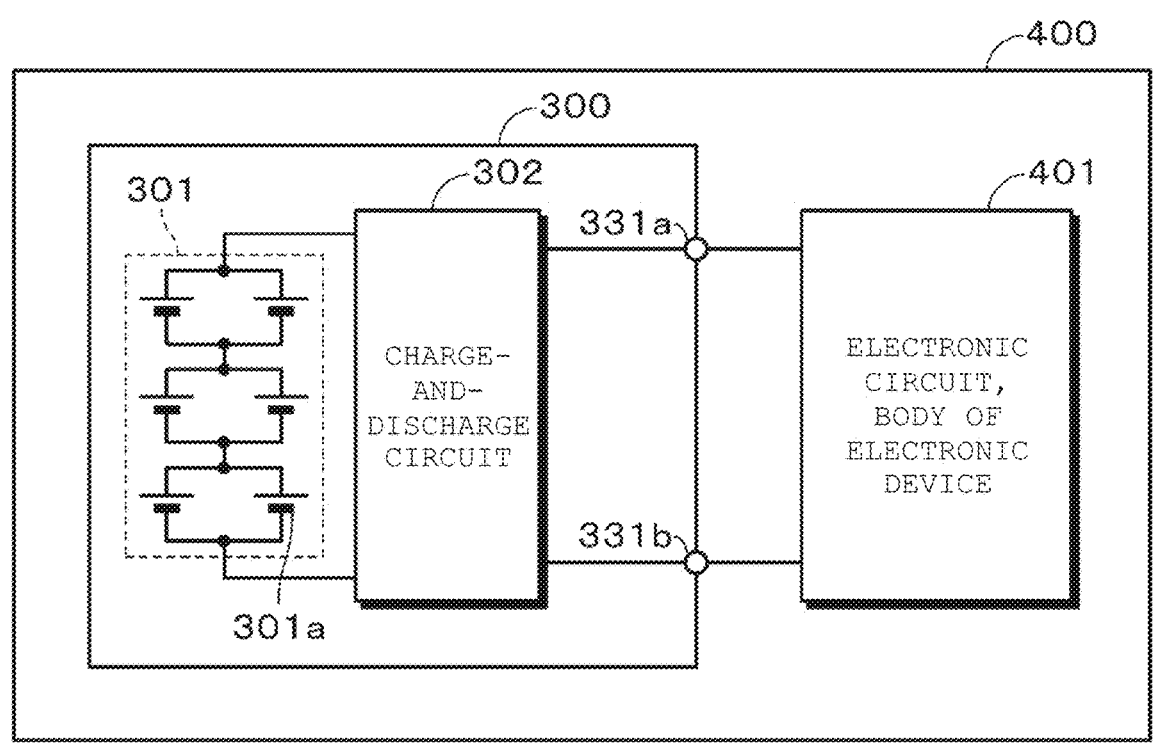
FIG. 5 is a block diagram illustrating an example of a configuration of an electronic device as an exemplified application according to an embodiment of the present technology.

A battery pack 300 and an electronic device 400, which represent an exemplified application, are hereinafter described referring to FIG. 5. The electronic device 400 includes an electronic circuit 401 constituting the body of this device, and the battery pack 300. The battery pack 300 is electrically connected to the electronic circuit 401 through a positive electrode terminal 331a and a negative electrode terminal 331b. The electronic device 400 is structured to allow a user to attach and detach the battery pack 300 to and from this device. The electronic device 400 is not necessarily thus structured. The battery pack 300 may be a built-in component of the electronic device 400 that the user is not allowed to remove from this device.

To electrically charge the battery pack 300, the positive electrode terminal 331a and the negative electrode terminal 331b of the battery pack 300 are respectively connected to a positive electrode terminal and a negative electrode terminal of a charger (not illustrated in the drawing). To electrically discharge the battery pack 300 (electronic device 400 in use), the positive electrode terminal 331a and the negative electrode terminal 331b of the battery pack 300 are respectively connected to the positive and negative electrode terminals of the electronic circuit 401.

Examples of the electronic device 400 may include but are not limited to such devices as laptop personal computer, tablet computer, mobile telephone (for example, smart phone), mobile information terminal (PDA: personal digital assistant), display (for example, LCD, EL display, electronic paper), imaging device (for example, digital still camera, digital video camera), audio device (for example, portable audio player), game machine, cordless portable handset, electronic book, electronic dictionary, radio, headphone, navigation system, memory card, pacemaker, hearing aid, electric power tool, electric razor, refrigerator, air conditioner, television, stereo, water heater, microwave oven, dish washer, washing machine, drier, lighting device, toy, medical device, robot, load conditioner, and signal apparatus.

The electronic circuit 401 includes, for example, a CPU, a peripheral logic unit, an interface unit, and a storage, and controls the whole operation of the electronic device 400.

The battery pack 300 includes a battery module 301 and a charge-and-discharge circuit 302. The battery module 301 includes a plurality of secondary batteries 301a that are connected in series and/or in parallel. The secondary batteries 301a are connected in, for example, n-parallel and m-series arrangement (n, m is a positive integral number). FIG. 5 shows an exemplified 2-parallel and 3-series (2P3S) connection of six secondary batteries 301a. The secondary battery according to the first or second embodiment is used as the secondary battery 301a.

The battery pack 300 having a battery module 301 including a plurality of secondary batteries 301a is hereinafter described. The battery pack 300 may have one secondary battery 301a instead of the battery module 301.

The charge-and-discharge circuit 302 is a controller that controls electrical charge and discharge of the battery module 301. For the electrical charge, the charge-and-discharge circuit 302 controls charge of the battery module 301. For the electrical discharge (electronic device 400 in use), the charge-and-discharge circuit 302 controls discharge of the electronic device 400.

An exemplified application 2 describes a power storage system for vehicle mounted with the battery according to the first or second embodiment.

Figure 6:
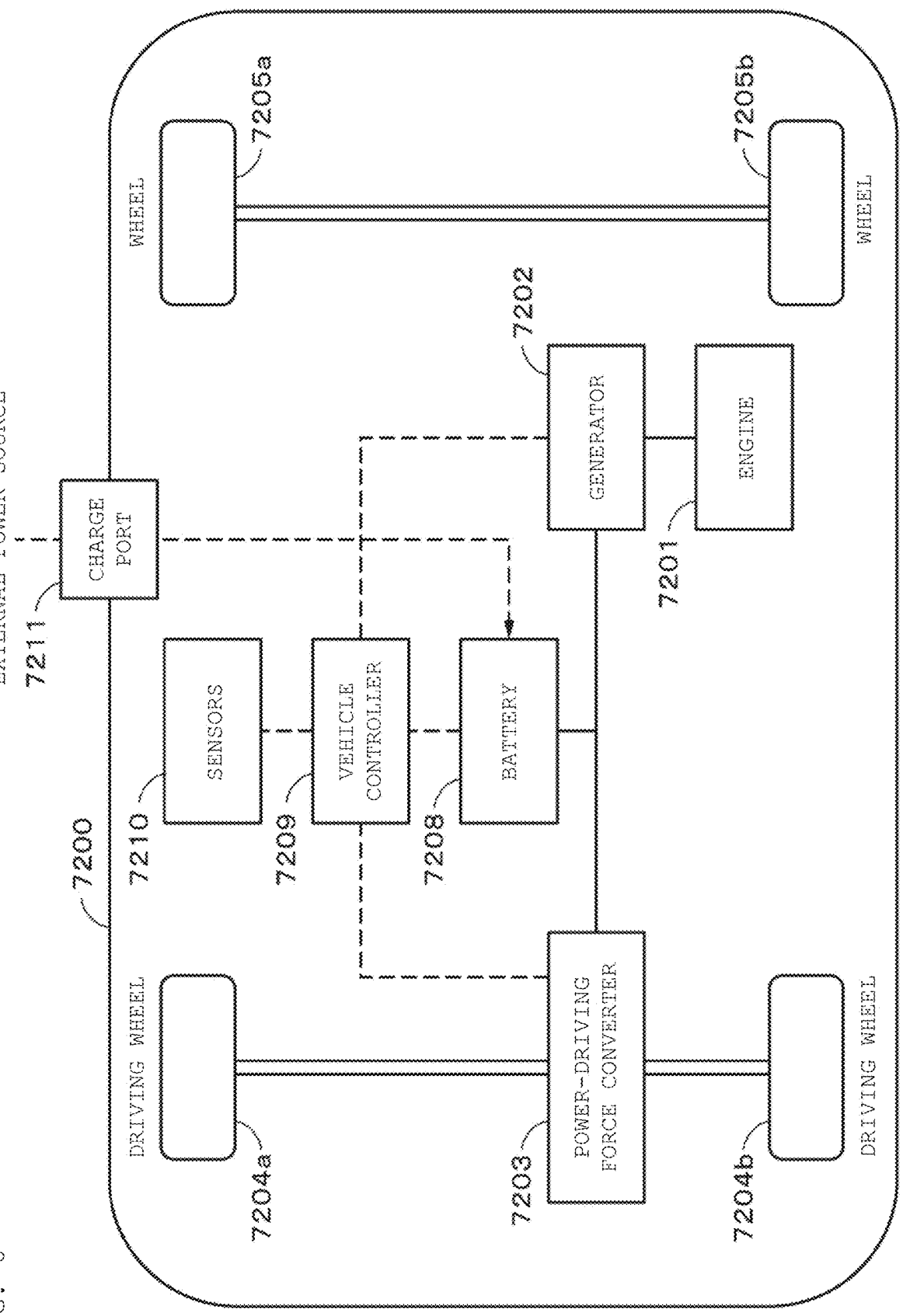
FIG. 6 is a schematic block diagram illustrating an example of a configuration of a power storage system used in a vehicle as an exemplified application according to an embodiment of the present technology.

An example is hereinafter described referring to FIG. 6, in which the technology disclosed herein is applied to a power storage system for vehicle. FIG. 6 is a schematic block diagram that illustrates a power storage system used in a hybrid vehicle driven by a series hybrid system to which the technology disclosed herein is applied. The series hybrid system drives a vehicle using a power-driving force converter and electric power currently generated by an engine-driven generator or the electric power thus generated and stored in the battery.

A hybrid vehicle 7200 described herein is loaded with an engine 7201, a generator 7202, a power-driving force converter 7203, a driving wheel 7204a, a driving wheel 7204b, a wheel 7205a, a wheel 7205b, a battery 7208, a vehicle controller 7209, sensors 7210, and a charge port 7211. The power storage device disclosed herein is applied to the battery 7208.

The hybrid vehicle 7200 is driven by a motive power supplied from the power-driving force converter 7203. An example of the power-driving force converter 7203 is a motor. The power-driving force converter 7203 operates with electric power supplied from the battery 7208, and the rotary force of the power-driving force converter 7203 is transmitted to the driving wheels 7204a and 7204b. The power-driving force converter 7203 may be applicable to either one of an alternating current motor or a direct current motor by selecting direct-alternating current (DC-AC) conversion or inverse conversion (AC-DC) for any required parts. The sensors 7210 controls, through the vehicle controller 7209, the number of engine rotations and the opening degree of a throttle valve not illustrated in the drawing (throttle opening). The sensors 7210 include a speed sensor, an acceleration sensor, and an engine rotation sensor.

The rotary force of the engine 7201 is transmitted to the generator 7202. The transmitted power allows the generator 7202 to generate electric power, and the generated power is stored in the battery 7208.

When the hybrid vehicle is decelerated by a brake mechanism not illustrated in the drawing, a resistance force at the time of deceleration is additionally transmitted as the rotary force to the power-driving force converter 7203. This rotary force allows the power-driving force converter 7203 generate regenerative power, and the regenerative power is stored in the battery 7208.

The battery 7208 may be connected to a power source provided on the outside of the hybrid vehicle, in which case the battery may receive power input from the power source through the charge port 7211 and store the received power.

Though not illustrated in the drawing, the hybrid vehicle may further include an information processor that processes information associated with vehicle control based on information of the secondary battery. An example of such an information processor may display a remaining battery level based on information of the battery's remaining power.

The description was given so far in reference to the series hybrid vehicle driven by a motor using electric power currently generated by the engine-driven generator or the electric power thus generated and stored in the battery. The technology disclosed herein is also applicable to a parallel hybrid vehicle in which outputs of an engine and a motor are both usable to drive the vehicle, and three driving modes; engine output alone, motor output alone, and engine and motor outputs, can be optionally switched to one another. The technology disclosed herein is further applicable to an electrically driven vehicle that can be driven by a motor alone without an engine.

Thus far was described an example of the hybrid vehicle 7200 to which the technology disclosed herein is applicable. Among the technical features described thus far, the technology disclosed herein is suitably applicable to the battery 7208.

An exemplified application 3 describes a power storage system for housing mounted with the battery according to the first or second embodiment.

An example is hereinafter described referring to FIG. 7, in which the technology disclosed herein is applied to a power storage system for housing. In a power storage system 9100 designed for a residence 9001, a power storage device 9003 is supplied with electric power from a centralized power system 9002, for example, a thermal power generation 9002a, an atomic power generation 9002b, or a hydraulic power generation 9002c, through an electric power network 9009, an information network 9012, a smart meter 9007, and a power hub 9008. The power storage device 9003 is also supplied with electric power from an independent power source, for example, a home power generator 9004. The supplied power is stored in the power storage device 9003. The power storage device 9003 feeds power required in the residence 9001. Such a similar power storage system may be used in buildings as well as in the residence 9001.

In the residence 9001 are installed the power storage device 9003, a power generator 9004, a power consumption apparatus 9005, a controller 9010 that controls the respective devices, a smart meter 9007, and sensors 9011 for obtaining various pieces of information. These devices are coupled to one another through the electric power network 9009 and the information network 9012. The power generator 9004 may be solar cells and/or fuel cells. The power consumption apparatus 9005 and/or the power storage device 9003 are supplied with power generated by the power generator 9004. Examples of the power consumption apparatus 9005 may include a refrigerator 9005*a*, an air conditioner 9005*b*, a television receiver 9005*c*, and a bath 9005*d*. Examples of the power consumption apparatus 9005 may further include an electrically driven vehicle 9006. Examples of the electrically driven vehicle 9006 may include an electric automobile 9006*a*, a hybrid car 9006*b*, and an electric bike 9006*c*.

The battery pack disclosed herein is applied to the power storage device 9003. The power storage device 9003 includes a secondary battery(s) or a capacitor. The power storage device 9003 may include a lithium ion battery(s). The lithium ion battery may be a stationary battery or a battery usable in the electrically driven vehicle 9006. The smart meter 9007 is equipped to measure the consumption of commercial power and to transmit the measured power consumption to an electric power company. The electric power network 9009 may employ any one of direct-current power feed, alternating-current power feed, and non-contact power feed, or a combination of two or more of them.

The sensors 9011 may include a human sensor, a light intensity sensor, an object detecting sensor, a power consumption sensor, a vibration sensor, a contact sensor, a temperature sensor, and an infrared sensor. Various pieces of information detected by the sensors 9011 are transmitted to the controller 9010. Weather conditions and human motions and activities, for example, may be grasped from the pieces of information transmitted from the sensors 9011 to allow energy consumption to be minimized through automatic control of the power consumption apparatus 9005. The controller 9010 may transmit information associated with the residence 9001 to the electric power company through the Internet.

Processes, for example, electric wire branching and direct-alternating current conversion, are done through the power hub 9008. For communication through the information network 9012 connected to the controller 9010 may be used a communication interface, for example, UART (Universal Asynchronous Receiver-Transmitter), or a sensor network that complies with a wireless communication protocol, for example, Bluetooth (registered trademark), ZigBee (registered trademark), or Wi-Fi. The Bluetooth (registered trademark) is applicable to multi-media communication, through which point-to-multipoint communication can be performed. The ZigBee (registered trademark) builds on the physical layer defined in IEEE (Institute of Electrical and Electronics Engineers) 802.15.4. The IEEE802.15.4 refers to a wireless network protocol for near-field communication, generally called PAN (Personal Area Network) or W (Wireless) PAN.

The controller 9010 is coupled to an external server 9013. The server 9013 may be managed under supervision by the residence 9001, an electric power company, or a service provider. Information transmitted and received through the server 9013 may be associated with power consumption, life pattern, electric power rate, weather, natural disaster, and/or electric power exchange deals. These pieces of information may be either transmitted to and received from the home power consumption apparatus (for example, television receiver) or transmitted to and received from an out-of-home apparatus (for example, mobile telephone). Such information may be displayed on a device equipped with a representational function, for example, television receiver, mobile telephone, or PDA (Personal Digital Assistant).

The controller 9010 that controls the respective components includes, for example, a CPU (Central Processing Unit), an RAM (Random Access Memory), and an ROM (Read Only Memory). In the illustrated example, the controller 9010 is stored in the power storage device 9003. The controller 9010 is connected to the power storage device 9003, home power generator 9004, power consumption apparatus 9005, sensors 9011, and server 9013 through the information network 9012. The controller 9010 includes functions to adjust the amounts of commercial power and of generated power. The controller may further have a function to conduct power exchange trades in the electricity market.

In the power storage device 9003 are thus storable power generated by the home power generator 9004 (solar power generation, wind power generation), as well as power supplied from the centralized power system 9002, for example, thermal power generation 9002*a*, atomic power generation 9002*b*, or hydraulic power generation 9002*c*. Any fluctuation of power generated by the home power generator 9004, for example, may be controlled by such power control as a constant output of generated power or discharge of excess power. For example, in addition to power generated by solar power generation and stored in the power storage device 9003, cheaper late-night power may also be stored during nighttime in the power storage device 9003. Then, power thus stored may be discharged and used during daytime slots when the electric power rate is higher.

Unlike the illustrated example in which the controller 9010 is stored in the power storage device 9003, the controller 9010 may be stored in the smart meter 9007 or may be an independent device. The power storage system 9100 may be targeted for a plurality of households in an apartment house or a plurality of individual houses.

Thus far was described an example of the power storage system 9100 to which the technology disclosed herein is applicable. Among the technical features described thus far, the technology disclosed herein is suitably applicable to the secondary battery of the power storage device 9003.

The technology disclosed herein is hereinafter described based on examples, however, should not be construed as being solely limited to these examples.

The average pore size of the binder's reticulated structure, CMC viscosity, and SBR average grain size described in the examples were measured by the method described in the first embodiment.

Example 1

A negative electrode was produced as follows. First, 98 parts by mass of graphite powder; negative electrode active material, and 2 parts by mass of a binder were mixed to prepare a negative electrode compound. The binder used was a reticulated binder, and was a mixture containing CMC (first binder) and SBR (second binder) by the mass ratio of CMC:SBR=1.3:2.0. Next, the negative electrode compound was dispersed in water used as solvent to prepare a pasty slurry of the negative electrode compound. Then, the prepared slurry of the negative electrode compound was injected with air in the form of gas bubbles and then applied under ultrasonic wave to one surface of a band-shaped copper foil (negative electrode current collector). The frequency of ultrasonic wave was set to 500 kHz. The applied slurry of the negative electrode compound was then dried to form a negative electrode active material layer having the density per area of 10 mg/cm². Lastly, the negative electrode active material layer was compressed by a roll pressing machine to form a negative electrode including a negative electrode active material layer having the density per volume of 1.65/cm³.

Comparative Example 1

A negative electrode was obtained similarly to the example 1 except that the slurry of the negative electrode compound was directly applied to one surface of a band-shaped copper foil without injection of gas bubbles or radiation of ultrasonic wave.

The negative electrode thus obtained before compression and the negative electrode finally obtained by the described steps were evaluated as follows.

After the slurry was dried, the negative electrode was cut in cross section before compression, and the cross-sectional surface was observed with the SEM.

A chemical cell (coin cell) for measuring charge-and-discharge efficiency was produced, in which the negative electrode was a working electrode and an Li metal was a counter electrode. This cell was charged and discharged under the following condition to measure the initial charge capacity and discharge capacity.

Charge: 0.1 C, 0 V, 1/300 cut
Discharge: 0.1 C, 0.8 V, 1/300 cut

The "0.1 C" is a current value at which a battery is charged or discharged to its full capacity (theoretical capacity) in 10 hours.

The charge-and-discharge efficiency was calculated by the following formula.

Initial charge-and-discharge efficiency (%)=((initial discharge capacity)/(initial charge capacity))× 100

Similarly to the evaluation described earlier, a chemical cell (coin cell) was produced and charged under the following condition, and then tested for the Li acceptance.

Charge: 1.5 C, 0 V, 90% capacity cut

The "1.5 C" is a current value at which a battery is charged or discharged to its full capacity (theoretical capacity) in 0.67 hours.

Figure 8A:
FIG. 8A is a cross-sectional SEM image of a negative electrode according to an example 1 before compression.
Figure 8B:
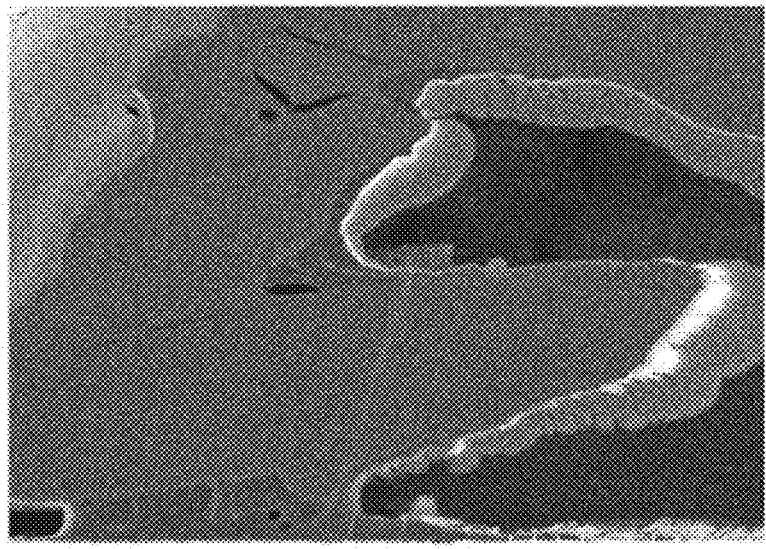
FIG. 8B is a cross-sectional SEM image of a negative electrode according to a comparative example 1 before compression.

FIGS. 8A and 8B respectively show cross-sectional images of the negative electrodes before compression according to the example 1 and the comparative example 1. FIG. 8A expressly indicates that the binder has a reticulated structure in the negative electrode active material layer before compression, and the reticulated structure is so present as to fill spaces between the negative electrode active material grains. Referring to FIG. 8B, on the other hand, the binder lacks a reticulated structure in the negative electrode active material layer before compression, and surfaces of the negative electrode active material grains are covered with the binder. The binder's reticulated structure is not lost after compression.

Figure 9A:
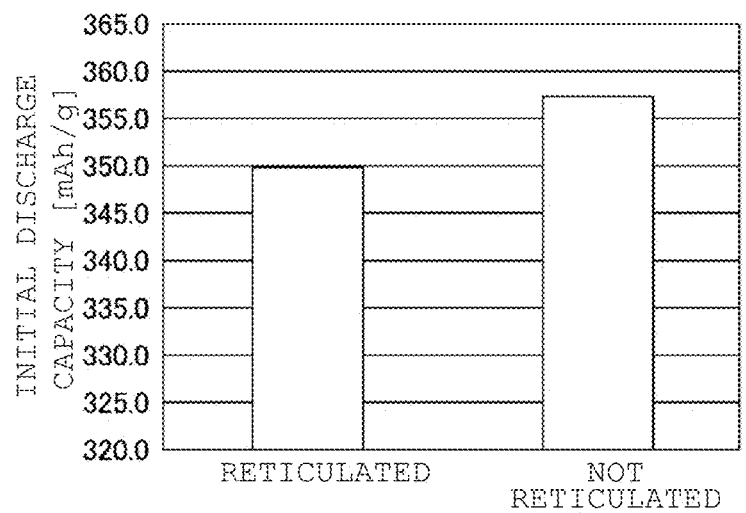
FIG. 9A is a graph showing initial capacities of coin-cell batteries respectively using the negative electrodes of the example 1 and of the comparative example 1.
Figure 9B:
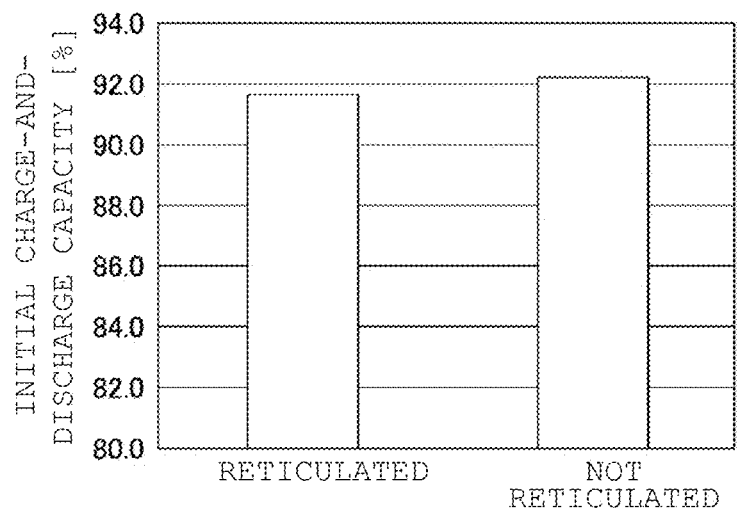
FIG. 9B is a graph showing initial charge-and-discharge efficiencies of the coin-cell batteries respectively using the negative electrodes of the example 1 and of the comparative example 1.

FIGS. 9A and 9B respectively show evaluation results of the initial discharge capacities and initial charge-and-discharge efficiencies of the example 1 and of the comparative example 1. FIGS. 9A and 9B teach that the negative electrode according to the example 1 including the reticulated binder is improved in initial discharge capacity and initial charge-and-discharge efficiency, as compared with the negative electrode according to the comparative example 1 in which the binder lacks a reticulated structure.

Figure 9C:
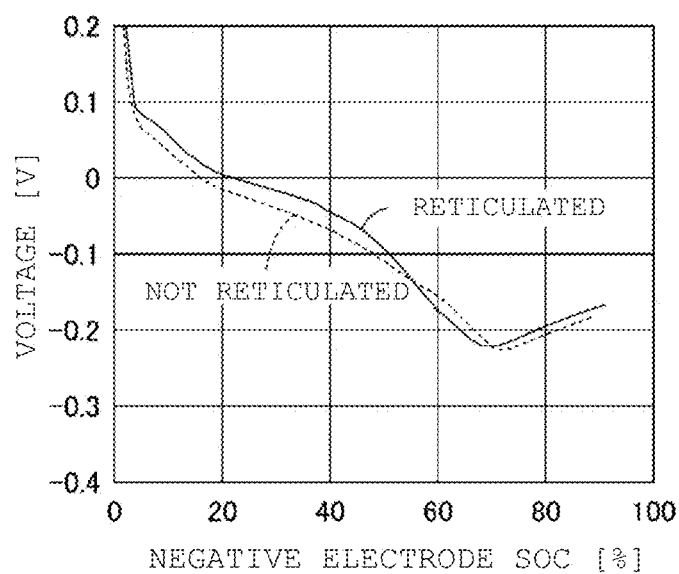
FIG. 9C is a graph showing Li acceptance test results of the coin-cell batteries respectively using the negative electrodes of the example 1 and of the comparative example 1.

FIG. 9C shows the result of the Li acceptance test. FIG. 9C teaches that the negative electrode according to the example 1 including the reticulated binder is improved in lithium acceptance and achieves reduction of overvoltage, as compared with the negative electrode according to the comparative example 1 in which the binder lacks a reticulated structure. The reduction of overvoltage was probably made possible because the reticulated binder decreased an amount of binder covering surfaces of the negative electrode active material grains, which reduced the risk of inhibited ion conduction and lowered the battery's internal resistance.

Examples 2-1 to 2-8

A negative electrode was produced as follows. First, 98 parts by mass of graphite powder; negative electrode active material, and 2 parts by mass of a binder were mixed to prepare a negative electrode compound. The binder used was a mixture containing CMC (first binder) and SBR (second binder) by the mass ratio of CMC:SBR=30:70. Next, the negative electrode compound was dispersed in water used as solvent to prepare a pasty slurry of the negative electrode compound. Then, the prepared slurry of the negative electrode compound was injected with air in the form of gas bubbles and then applied under ultrasonic wave to both surfaces of a band-shaped copper foil (negative electrode current collector). The frequency of ultrasonic wave was changed per sample in the range of 20 kHz to 3 mHz, and the size of gas bubbles included in the slurry of the negative electrode compound was also changed per sample. The applied slurry of the negative electrode compound was then dried to form a negative electrode active material layer having the density per area of 5 mg/cm². Lastly, the negative electrode active material layer was compressed by a roll pressing machine to form a negative electrode. The negative electrode thus obtained included the negative electrode active material layer having the density per volume of 1.70 g/cm³, and the average pore size of the reticulated binder included in the negative electrode active material layer was between 0.5 nm and 8,000 nm (see Table 1).

Comparative Example 2-1

A negative electrode was obtained similarly to the example 2-1 except that the slurry of the negative electrode compound was directly applied to both surfaces of a band-shaped copper foil without injection of gas bubbles or radiation of ultrasonic wave.

Examples 3-1 to 3-8, Comparative Example 3-1

The mass ratio of CMC to SBR was changed per sample in the range of 100:0 to 0:100. The size of gas bubbles included in the slurry of the negative electrode compound was adjusted, so that the reticulated structure finally obtained had the average pore size of 500 nm. Except these changes, negative electrodes were obtained similarly to the example 2-1.

Comparative Example 3-2

A negative electrode was obtained similarly to the comparative example 3-1 except that the slurry of the negative electrode compound was directly applied to both surfaces of a band-shaped copper foil without injection of gas bubbles or radiation of ultrasonic wave.

Examples 4-1 to 4-6, Comparative Example 4-1

The viscosity of CMC was changed per sample in the range of 1 mPa·s to 25,000 mPa·s (see Table 3). The size of gas bubbles included in the slurry of the negative electrode compound was adjusted, so that the reticulated structure finally obtained had the average pore size of 1,100 nm. Except these changes, negative electrodes were obtained similarly to the example 2-1.

Comparative Example 4-2

A negative electrode was obtained similarly to the example 4-5 except that the slurry of the negative electrode compound was directly applied to both surfaces of a band-shaped copper foil without injection of gas bubbles or radiation of ultrasonic wave.

Examples 5-1 to 5-6

The average grain size of SBR was changed per sample in the range of 50 nm to 1,000 nm (see Table 4). The size of gas bubbles included in the slurry of the negative electrode compound was adjusted, so that the reticulated structure finally obtained had the average pore size of 900 nm. Except these changes, negative electrodes were obtained similarly to the example 2-1.

Comparative Example 5-1

A negative electrode was obtained similarly to the example 5-4 except that the slurry of the negative electrode compound was directly applied to both surfaces of a band-shaped copper foil without injection of gas bubbles or radiation of ultrasonic wave.

Examples 6-1 to 6-10

The mass ratio of the binder included in the negative electrode active material layer to the negative electrode active material was changed per sample in the range of 25:75 to 04:99.6 (see Table 5). The size of gas bubbles included in the slurry of the negative electrode compound was adjusted, so that the reticulated structure finally obtained had the average pore size of 1,000 nm. Except these changes, negative electrodes were obtained similarly to the example 2-1.

Examples 6-11

A negative electrode was obtained similarly to the example 6-10 except that the average pore size of the reticulated structure was changed to 8,000 nm to adjust a peel strength, as shown in Table 5.

Comparative Examples 6-1 and 6-2

A negative electrode was obtained similarly to the examples 6-3 and 6-9 except that the slurry of the negative electrode compound was directly applied to both surfaces of a band-shaped copper foil without injection of gas bubbles or radiation of ultrasonic wave.

The negative electrodes thus obtained were evaluated as follows.

The negative electrodes were each cut out in cross section, and the cross-sectional surface was observed with the SEM to check whether the reticulated structure was present or not.

A peel strength testing tape was bonded to each negative electrode. Then, the tape-bonded negative electrodes were tested for a 180-degree peel strength pursuant to iso29862: 2007(JIS Z 0237).

A negative electrode was separately produced that was structured similarly to the examples and comparative examples described so far except that the negative electrode active material layer was formed on one surface alone of the negative electrode current collector. A chemical cell (coin cell) for measuring the charge-and-discharge efficiency was produced, in which this negative electrode separately produced was a working electrode and an Li metal was a counter electrode. This cell was charged and discharged under the following condition to measure the initial charge capacity and initial discharge capacity.

Charge: 0.1 C, 0 V, 1/300 cut
Discharge: 0.1 C, 0.8 V, 1/300 cut

The "0.1 C" is a current value at which a battery is charged or discharged to its full capacity (theoretical capacity) in 10 hours.

The charge-and-discharge efficiency was calculated by the following formula.

$$\text{Initial charge-and-discharge efficiency (\%)} = ((\text{initial discharge capacity})/(\text{initial charge capacity})) \times 100$$

Secondary batteries for evaluation were produced in which the negative electrodes obtained as described were used.

A positive electrode was produced as follows. First, lithium carbonate ($Li_2CO_3$) and cobalt carbonate ($CoCO_3$) were mixed by the molar ratio of 0.5:1 and fired in an air atmosphere at 900° C. for five hours to obtain a lithium-cobalt composite oxide ($LiCoO_2$) as positive electrode active material. Next, 91 parts by mass of the lithium-cobalt composite oxide thus obtained, 6 parts by mass of graphite as conductive agent, and 3 parts by mass of polyvinylidene fluoride as binder were mixed to prepare a compound for positive electrode. Then, this positive electrode compound was dispersed in N-methyl-2-pyrrolidone to prepare a pasty slurry of the positive electrode compound. Then, the prepared slurry was applied to both surfaces of a positive electrode current collector including a band-shaped aluminum foil (thickness of 12 μm) and then dried. This slurry-applied positive electrode current collector was compressed by a roll pressing machine into a positive electrode active material layer.

The batteries were produced according to the following assembling steps. The positive electrode and the negative electrode obtained as described thus far, and a separator including a microporous polyethylene oriented film of 23 µm in thickness were stacked in layers in the order of the negative electrode, separator, positive electrode, and separator. Then, this layered body was wound multiple times in a roll. As a result, a rolled electrode in the form of a jelly roll was obtained and used as power generator.

A center pin is inserted through a center hole of the rolled electrode, and the rolled electrode was held between a pair of insulating plates. Then, a negative electrode lead was welded to a battery can, a positive electrode lead was welded to a safety valve mechanism, and the rolled electrode was contained in the battery can. Next, ethylene carbonate and methyl ethyl carbonate were mixed in a solvent by the volume ratio of 1:1, and $LiPF_6$ as electrolyte salt was dissolved in the resulting solvent at the concentration of 1 $mol/dm^3$ to prepare a non-aqueous electrolytic solution.

Lastly, the battery can containing the rolled electrode was injected with an electrolytic solution and then crimped with an insulating sealing gasket interposed therebetween so as to fixate the safety valve, PTC element, and battery lid. As a result, a cylindrical secondary battery of 18 mm in outer diameter and 65 mm in height was obtained.

The secondary batteries thus produced were each charged and discharged under the following condition to calculate a discharge capacity under light load.
Charge: 0.7 C, 4.2 V, capacity 1/40 cut
Discharge: 0.5 C, 3 V cut The secondary batteries were each charged and discharged under the following condition to calculate a discharge capacity under heavy load.
Charge: 0.7 C, 4.2 V, capacity 1/40 cut
Discharge: 5 C, 3 V cut The "0.7 C" is a current value at which a battery is charged or discharged to its full capacity (theoretical capacity) in 1.43 hours. The "0.5 C" is a current value at which a battery is charged or discharged to its full capacity (theoretical capacity) in two hours. The "5 C" is a current value at which a battery is charged or discharged to its full capacity (theoretical capacity) in 0.2 hours. The "5 C" is a current value 10 times as large as "0.5 C".

Next, output characteristics were calculated by the following formula.

Output characteristics=(discharge capacity under heavy load)/(discharge capacity under light load)

(Cycle Characteristics)

The secondary batteries were each charged and discharged under the following condition for 1,000 cycles to calculate discharge capacities at the 10th cycle and at the 1,000th cycle.
Charge: 0.7 C, 4.2 V, capacity 1/40 cut
Discharge: 1 C, 3 V cut The "1 C" is a current value at which a battery is charged or discharged to its full capacity (theoretical capacity) in one hour.

Next, a capacity maintenance factor was calculated.

Capacity maintenance factor (%)=((capacity after 1,000 cycles)/(capacity after 10 cycles))×100

TABLE 1

| | Binder structure | Average pore size (nm) | First binder CMC (mass %) | Second binder SBR (mass %) | Negative electrode-area density (mg/cm²) | Negative electrode-volume density (g/cm³) | Peel strength on one surface (mN/mm) | Charge- and discharge efficiency (%) | Output characteristics (−) | Cycle characteristics (%) |
|---|---|---|---|---|---|---|---|---|---|---|
| Working example 2-1 | Reticulated | 0.5 | 30 | 70 | 5 | 1.7 | 2.6 | 93 | 0.79 | 81 |
| Working example 2-2 | Reticulated | 5 | 30 | 70 | 5 | 1.7 | 4.2 | 94 | 0.89 | 90 |
| Working example 2-3 | Reticulated | 10 | 30 | 70 | 5 | 1.7 | 4.3 | 94 | 0.90 | 91 |
| Working example 2-4 | Reticulated | 100 | 30 | 70 | 5 | 1.7 | 4.8 | 94 | 0.91 | 92 |
| Working example 2-5 | Reticulated | 1000 | 30 | 70 | 5 | 1.7 | 5.0 | 94 | 0.92 | 93 |
| Working example 2-6 | Reticulated | 3000 | 30 | 70 | 5 | 1.7 | 5.4 | 94 | 0.91 | 95 |
| Working example 2-7 | Reticulated | 5000 | 30 | 70 | 5 | 1.7 | 4.8 | 94 | 0.89 | 92 |
| Working example 2-8 | Reticulated | 8000 | 30 | 70 | 5 | 1.7 | 2.6 | 95 | 0.78 | 82 |
| Comparative example 2-1 | Not reticulated | — | 30 | 70 | 5 | 1.7 | 2.2 | 91 | 0.75 | 78 |

Referring to Table 1, the "reticulated" indicates that the binder has a reticulated structure and is so present that its reticulated structure fills spaces between the active material grains and between the active material grains and current collector. The same goes for "reticulated" in Tables 2 to 5.

Table 1 teaches the following facts. Since the reticulated binder is so present that its reticulated structure fills spaces between the active material grains and between the active material grains and current collector, the negative electrode active material layer may be improved in peel strength without increasing the binder to be added. This may provide improved cycle characteristics. For a better peel strength (i.e., cycle characteristics), the average pore size of the binder's reticulated structure may preferably be between 5 nm and 5 µm, more preferably between 100 nm and 5 µm, and even more preferably between 1 µm and 3 µm.

The binder thus characterized may decrease an amount of binder covering surfaces of the negative electrode active material grains, which leads to improved output characteristics. With the object of improving the output characteristics, the average pore size of the reticulated binder may preferably be between 5 nm and 5 µm.

TABLE 2

| | Binder structure | (With/without) microbubble treatment | Average pore size (nm) | First binder CMC (mass %) | Second binder SBR (mass %) | Negative electrode-area density (mg/cm$^2$) | Negative electrode-volume density (g/cm$^3$) | Peel strength on one surface (mN/mm) | Charge-and-discharge effficiency (%) | Output characteristics (-) | Cycle characteristics (%) |
|---|---|---|---|---|---|---|---|---|---|---|---|
| Working example 3-1 | Reticulated | With | 500 | 100 | 0 | 5 | 1.7 | 2.9 | 95 | 0.86 | 85 |
| Working example 3-2 | Reticulated | With | 500 | 90 | 10 | 5 | 1.7 | 4 | 95 | 0.90 | 90 |
| Working example 3-3 | Reticulated | With | 500 | 65 | 35 | 5 | 1.7 | 4.1 | 95 | 0.90 | 91 |
| Working example 3-4 | Reticulated | With | 500 | 40 | 60 | 5 | 1.7 | 4.8 | 95 | 0.91 | 93 |
| Working example 3-5 | Reticulated | With | 500 | 30 | 70 | 5 | 1.7 | 5.0 | 94 | 0.92 | 95 |
| Working example 3-6 | Reticulated | With | 500 | 20 | 80 | 5 | 1.7 | 5.4 | 93 | 0.91 | 95 |
| Working example 3-7 | Reticulated | With | 500 | 1 | 99 | 5 | 1.7 | 4.8 | 92 | 0.90 | 93 |
| Working example 3-8 | Reticulated | With | 500 | 0.5 | 99.5 | 5 | 1.7 | 2.5 | 91 | 0.82 | 83 |
| Compartive example 3-1 | Not reticulated | With | | 0 | 100 | 5 | 1.7 | 2.1 | 89 | 0.77 | 77 |
| Comparative example 3-2 | Not reticulated | Without | Without | 0 | 100 | 5 | 1.7 | 2.1 | 89 | 0.77 | 77 |

Referring to Table 2, "microbubble treatment" indicates ultrasonic radiation to the gas bubble-injected slurry of the negative electrode compound.

Table 2 teaches the following facts. For a better peel strength (i.e., cycle characteristics), the mass ratio of CMC to SBR may preferably be in the range of 1:99 to 90:10, more preferably in the range of 1:99 to 40:60, and even more preferably in the range of 20:80 to 30:70. With the object of improving the output characteristics, the mass ratio of CMC to SBR may preferably be in the range of 1:99 to 90:10.

Ultrasonic radiation to the gas bubble-injected slurry of the negative electrode compound may fail to reticulate the binder solely consisting of SBR. Therefore, combined use of CMC and SBR may be required to allow the binder to have a reticulated structure.

TABLE 3

| | Binder structure | Average pore size (nm) | First binder CMC (mass %) | Second binder SBR (mass %) | CMC viscosity (mPa · s) | SBR grain size (nm) | Peel strength on one surface (mN/mm) | Charge-and-discharge efficiency (%) | Output characteristics (-) | Cycle characteristics (%) |
|---|---|---|---|---|---|---|---|---|---|---|
| Working example 4-1 | Reticulated | 1100 | 30 | 70 | 1 | 200 | 2.8 | 89 | 0.79 | 79 |
| Working example 4-2 | Reticulated | 1100 | 30 | 70 | 10 | 200 | 4.6 | 94 | 0.90 | 91 |
| Working example 4-3 | Reticulated | 1100 | 30 | 70 | 100 | 200 | 4.9 | 95 | 0.91 | 92 |
| Working example 4-4 | Reticulated | 1100 | 30 | 70 | 1000 | 200 | 5.4 | 95 | 0.92 | 94 |
| Working example 4-5 | Reticulated | 1100 | 30 | 70 | 4000 | 200 | 5.4 | 95 | 0.91 | 95 |
| Working example 4-6 | Reticulated | 1100 | 30 | 70 | 18000 | 200 | 4.5 | 93 | 0.90 | 90 |
| Comparative example 4-1 | Not reticulated | — | 30 | 70 | 25000 | 200 | 2.5 | 90 | 0.78 | 78 |
| Comparative example 4-2 | Not reticulated | — | 30 | 70 | 4000 | 200 | 2.2 | 88 | 0.76 | 77 |

Table 3 teaches the following facts. With the object of improving the peel strength (i.e., cycle characteristics), CMC in an aqueous solution containing 1 mass % of CMC may preferably have a viscosity of 10 mPa·s to 18,000 mPa·s, more preferably 100 Pa·s to 4,000 Pa·s, and even more preferably 1,000 Pa·s to 4,000 mPa·s. With the object of improving the output characteristics, CMC in the aqueous solution containing 1 mass % of CMC may preferably have a viscosity of 10 mPa·s to 18,000 mPa·s.

Table 5 shows no evaluation result for the comparative example 6-1, because the comparative example 6-1 had difficulty in forming a negative electrode due to the lack of an adequate peel strength.

Table 5 teaches the following facts. It is known from the evaluation results of the examples 6-1 to 6-10 that, in order to improve the peel strength (i.e., cycle characteristics), the mass ratio of the binder to the total mass of the binder and the negative electrode active material may preferably be 0.5

TABLE 4

| | Binder structure | Average pore size (nm) | First binder CMC (mass %) | Second binder SBR (mass %) | CMC viscosity (mPa · s) | SBR grain size (nm) | Peel strength on one surface (mN/mm) | Charge-and-discharge efficiency (%) | Output characteristics (−) | Cycle characteristics (%) |
|---|---|---|---|---|---|---|---|---|---|---|
| Working example 5-1 | Reticulated | 900 | 30 | 70 | 4000 | 50 | 2.7 | 89 | 0.78 | 79 |
| Working example 5-2 | Reticulated | 900 | 30 | 70 | 4000 | 80 | 4.9 | 93 | 0.9 | 92 |
| Working example 5-3 | Reticulated | 900 | 30 | 70 | 4000 | 100 | 5.3 | 94 | 0.91 | 94 |
| Working example 5-4 | Reiculated | 900 | 30 | 70 | 4000 | 200 | 5.4 | 95 | 0.91 | 95 |
| Working example 5-5 | Reticulated | 900 | 30 | 70 | 4000 | 500 | 4.8 | 95 | 0.9 | 93 |
| Working example 5-6 | Reticulated | 900 | 30 | 70 | 4000 | 1000 | 2.8 | 89 | 0.78 | 79 |
| Comparative example 5-1 | Not reticulated | — | 30 | 70 | 4000 | 200 | 2.2 | 88 | 0.76 | 77 |

Table 4 teaches the following facts. With the object of improving the peel strength (i.e., cycle characteristics), the average grain size of SBR may preferably be between 80 nm and 500 nm, and more preferably between 100 nm and 200 nm. With the object of improving the output characteristics, the average grain size of SBR may preferably be between 80 nm and 500 nm.

or more, and more preferably 1.0 or more. With the object of improving the output characteristics, the mass ratio of the binder to the total mass of the binder and the negative electrode active material may preferably be 20 or less, and more preferably 15 or less. In order to improve the output characteristics and cycle characteristics both, the mass ratio of the binder included in the negative electrode active

TABLE 5

| | Binder structure | Average pore size (nm) | Binder (mass %) | Active material grains (mass %) | Negative electrode-area density (mg/cm$^2$) | Negative electrode volume density (g/cm$^3$) | Peel strength on one surface, (mN/mm) | Charge-and-discharge efficiency | Output characteristics (−) | Cycle characteristics (%) |
|---|---|---|---|---|---|---|---|---|---|---|
| Working example 6-1 | Reticulated | 1000 | 0.4 | 99.6 | 5 | 1.7 | 0.05 | 86 | 0.65 | 81 |
| Working example 6-2 | Reticulated | 1000 | 0.5 | 99.5 | 5 | 1.7 | 0.1 | 93 | 0.90 | 90 |
| Working example 6-3 | Reticulated | 1000 | 1 | 99 | 5 | 1.7 | 1.5 | 94 | 0.90 | 92 |
| Working example 6-4 | Reticulated | 1000 | 1.5 | 98.5 | 5 | 1.7 | 3.5 | 94 | 0.91 | 94 |
| Working example 6-5 | Reticulated | 1000 | 2 | 98 | 5 | 1.7 | 4.8 | 95 | 0.91 | 95 |
| Working example 6-6 | Reticulated | 1000 | 5 | 95 | 5 | 1.7 | 9.5 | 95 | 0.90 | 96 |
| Working example 6-7 | Reticulated | 1000 | 10 | 90 | 5 | 1.7 | 23 | 95 | 0.89 | 96 |
| Working example 6-8 | Reticulated | 1000 | 15 | 85 | 5 | 1.7 | 45 | 95 | 0.87 | 93 |
| Working example 6-9 | Reticulated | 1000 | 20 | 80 | 5 | 1.7 | 80 | 94 | 0.85 | 90 |
| Working example 6-10 | Reticulated | 1000 | 25 | 75 | 5 | 1.7 | 112 | 94 | 0.74 | 86 |
| Working example 6-11 | Reticulated | 8000 | 25 | 75 | 5 | 1.7 | 78 | 93 | 0.70 | 85 |
| Comparative example 6-1 | Not reticulated | — | 1 | 99 | — | — | — | — | — | — |
| Comparative example 6-2 | Not reticulated | — | 20 | 80 | 5 | 1.7 | 40 | 82 | 0.60 | 62 | material layer to the negative electrode active material (binder:negative electrode active material) may preferably be in the range of 20:80 to 0.5:99.5, more preferably in the range of 20:80 to 1:99, and even more preferably in the range of 15:85 to 1:99.

It is known from the evaluation results of the examples 6-10 and 6-11 that adjustment of the average pore size of the binder's reticulated structure may lower the peel strength with the same amount of binder. The result also shows that the mass ratio, 25:75, of the binder to the negative electrode active material resulted in lower output characteristics, with a peel strength of 80 mN/mm or less.

The evaluation result of the comparative example 6-1 demonstrates that the negative electrode including the non-reticulated binder was difficult to form due to the lack of an adequate peel strength despite the mass ratio, 1:99, of the binder to the negative electrode active material. The evaluation result of the comparative example 6-2 demonstrates that the negative electrode including the non-reticulated binder resulted in poor output characteristics and cycle characteristics despite the mass ratio, 20:80, of the binder to the negative electrode active material.

The embodiments, modified embodiments, and examples of the technology disclosed herein were thus far described. The technology disclosed herein should not be construed as being limited to the embodiments, modified embodiments, or examples, and may be variously modified within the scope of its technical idea.

For example, any means, methods, processes, shapes, and numerical values described in the embodiments, modified embodiments, and examples were only given by way of example, and may be replaced with any other suitable means, methods, processes, shapes, and numerical values, if necessary. The chemical formulas of the compounds were given herein as typical examples, and valences in these formulas, for example, are not limited insofar as the formulas represent generic names of the relevant compounds.

The any means, methods, processes, shapes, and numerical values described in the embodiments, modified embodiments, and examples may be optionally combined unless such combinations depart from the scope of what is described herein.

While the technology disclosed herein was applied to the cylindrical and laminate film secondary batteries in the embodiments and examples, the battery's shape is not necessarily limited. The technology disclosed herein may be applied to angular and coin-shaped secondary batteries, and may be further applicable to flexible batteries mountable in wearable terminals, for example, smart watches, head-mountable displays, and iGlass (registered trademark).

While the technology disclosed herein was applied to the electrode-rolled battery in the embodiments and examples, the battery structure is not particularly limited. The technology disclosed herein may be applicable to, for example, a secondary battery including layers of positive and negative electrodes (stacked electrode structure) or a secondary battery including folded positive and negative electrodes.

The technology disclosed herein, which was applied to the negative electrode in the embodiments and examples, may be applied to the positive electrode.

While the electrodes (positive and negative electrodes) described in the embodiments and examples each include a current collector and an active material layer, the electrodes are not necessarily structurally limited. For example, the electrodes may each include an active material layer alone.

The positive electrode active material layer may be a green compact including a positive electrode material or a sintered green sheet including a positive electrode material. Similarly, the negative electrode active material layer may be a green compact or a sintered green sheet.

While the technology disclosed herein was applied to the lithium ion secondary battery and the lithium ion polymer secondary battery in the embodiments and examples, batteries to which the technology disclosed herein is applicable are not necessarily limited to such batteries. The technology disclosed herein may be applied to a sodium ion secondary battery or a bulk all-solid state battery.

The present technology is described below in further detail according to an embodiment.

(1)

A battery including a positive electrode, a negative electrode, and an electrolyte and characterized in that the negative electrode includes grains of an active material and a binder having a reticulated structure, and spaces between the active material grains are filled with the reticulated structure.

(2)

The battery of (1) further characterized in that the reticulated structure has an average pore size greater than or equal to 5 nm and less than or equal to 5 μm.

(3)

The battery of (2) further characterized in that the average pore size is calculated on a cross-sectional SEM image.

(4)

The battery of one of (1) to (3) further characterized in that the binder includes a first binder and a second binder, the first binder includes at least one of carboxyalkyl cellulose and a metallic salt thereof, and the second binder includes at least one of a styrene butadiene rubber and a derivative thereof.

(5) The battery of (4) further characterized in that the carboxyalkyl cellulose includes at least one of carboxymethyl cellulose, carboxypropyl methyl cellulose, carboxypropyl cellulose, carboxyethyl cellulose, hydroxypropyl methyl cellulose, and hydroxypropyl ethyl cellulose.

(6)

The battery of (4) or (5) further characterized in that the first binder in an aqueous solution containing 1 mass % of the first binder has a viscosity greater than or equal to 10 mPa·s and less than or equal to 18,000 mPa·s.

(7)

The battery of one of (4) to (6) further characterized in that the second binder has an average grain size greater than or equal to 80 nm and less than or equal to 500 nm.

(8)

The battery of one of (4) to (7) further characterized in that the mass ratio of the first binder to the second binder (first binder:second binder) is in the range of 1:99 to 90:10.

(9)

The battery of one of (1) to (8) further characterized in that the mass ratio of the binder to the active material grains (binder:active material grains) is in the range of 20:80 to 1:99.

(10)

The battery of one of (1) to (9) further characterized in that the negative electrode includes a current collector and an active material layer formed on at least one surface of the current collector and including the active material grains and the binder, and spaces between the active material grains and the current collector are filled with the reticulated structure.

(11)

The battery of (10) further characterized in that a peel strength between the active material layer and the current collector is greater than or equal to 0.1 mN/mm and less than or equal to 80 mN/mm.

(12)

The battery of (11) further characterized in that the peel strength is measured pursuant to iso29862:2007 (JIS Z 0237).

(13)

A negative electrode including an active material grain and a binder having a reticulated structure and further characterized in that spaces between the active material grains are filled with the reticulated structure.

(14)

A battery pack including the battery of one of (1) to (12), and a controller that controls the battery.

(15)

An electronic device including the battery of one of (1) to (12) and receiving power feed from the battery.

(16)

An electrically driven vehicle including the battery of one of (1) to (12), a converter that receives power feed from the battery and converts the power received into a driving force for a vehicle, and a controller that processes information associated with vehicle control based on battery-related information.

(17)

A power storage device including the battery of one of (1) to (12) and feeding an electronic device connected to the battery with power.

(18)

The power storage device of (17) further including a power-related information controller that transmits and receives a signal to and from another device through a network and further characterized in that the battery is charged and discharged based on information received by the power-related information controller.

(19)

A power system including the battery of one of (1) to (12) and receiving power feed from the battery.

(20)

The power system of (19) further characterized in that the battery receives power feed from a power generator or an electric power network.

The technology disclosed herein may also provide the following technical features.

(1A)

A battery including a positive electrode, a negative electrode, and an electrolyte and characterized in that the negative electrode includes grains of an active material and a binder having a reticulated structure, and spaces between the active material grains are filled with the reticulated structure.

(2A)

The battery of (1A) further characterized in that the reticulated structure has an average pore size greater than or equal to 5 nm and less than or equal to 5 μm.

(3A)

The battery of (2A) further characterized in that the average pore size is calculated on a cross-sectional SEM image.

(4A)

The battery of one of (1A) to (3A) further characterized in that the binder includes a first binder and a second binder, the first binder includes at least one of carboxyalkyl cellulose and a metallic salt thereof, and the second binder includes at least one of a styrene butadiene rubber and a derivative thereof.

(5A)

The battery of (4A) further characterized in that the carboxyalkyl cellulose includes at least one of carboxymethyl cellulose, carboxypropyl methyl cellulose, carboxypropyl cellulose, carboxyethyl cellulose, hydroxypropyl methyl cellulose, and hydroxypropyl ethyl cellulose.

(6A)

The battery of (4A) or (5A) further characterized in that the first binder in an aqueous solution containing 1 mass % of the first binder has a viscosity greater than or equal to 10 mPa·s and less than or equal to 18,000 mPa·s.

(7A)

The battery of one of (4A) to (6A) further characterized in that the second binder has an average grain size greater than or equal to 80 nm and less than or equal to 500 nm.

(8A)

The battery of one of (4A) to (7A) further characterized in that the mass ratio of the first binder to the second binder (first binder:second binder) is in the range of 1:99 to 90:10.

(9A)

The battery of one of (1A) to (8A) further characterized in that the mass ratio of the binder to the active material grains (binder:active material grains) is in the range of 20:80 to 0.5:99.5.

(10A)

The battery of one of (1A) to (9A) further characterized in that the mass ratio of the binder to the active material grains (binder:active material grains) is in the range of 20:80 to 1:99.

(11A)

The battery of one of (1A) to (10A) further characterized in that the negative electrode includes a current collector, and an active material layer formed on at least one surface of the current collector and including the active material grains and the binder, and spaces between the active material grains and the current collector are filled with the reticulated structure.

(12A)

The battery of (11A) further characterized in that a peel strength between the active material layer and the current collector is greater than or equal to 0.1 mN/mm and less than or equal to 80 mN/mm.

(13A)

The battery of (12A) further characterized in that the peel strength is measured pursuant to iso29862:2007 (JIS Z 0237).

(14A)

A negative electrode including an active material grain and a binder having a reticulated structure and further characterized in that spaces between the active material grains are filled with the reticulated structure.

(15A)

A battery pack including the battery of one of (1) to (13A), and a controller that controls the battery.

(16A)

An electronic device including the battery of one of (1) to (13A) and receiving power feed from the battery.

(17A)

An electrically driven vehicle including the battery of one of (1) to (13A), a converter that receives power feed from the battery and converts the power received into a driving force for a vehicle, and a controller that processes information associated with vehicle control based on battery-related information.

(18A)

A power storage device including the battery of one of (1) to (13A) and feeding an electronic device connected to the battery with power.

(19A)

The power storage device of (18A) further including a power-related information controller that transmits and receives a signal to and from another device through a network and further characterized in that the battery is charged and discharged based on information received by the power-related information controller.

(20A)

A power system including the battery of one of (1) to (13A) and receiving power feed from the battery.

(21A)

The power system of (20A) further characterized in that the battery receives power feed from a power generator or an electric power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery, comprising:
a positive electrode;
a negative electrode; and
an electrolyte,
wherein the negative electrode includes an active material having grains and a binder having a reticulated structure, and
wherein spaces between the grains of the active material are filled with the reticulated structure of the binder,
wherein the reticulated structure has an average pore size from 900 nm to 5 μm,
wherein the binder includes:
a first binder including at least one of carboxyalkyl cellulose and a metallic salt thereof; and
a second binder including at least one of a styrene butadiene rubber and a derivative thereof
wherein the second binder has an average grain size from 80 nm to 200 nm.

2. The battery according to claim 1, wherein the average pore size is calculated by a cross-sectional SEM image.

3. The battery according to claim 1, wherein the carboxyalkyl cellulose includes at least one of carboxymethyl cellulose, carboxypropyl methyl cellulose, carboxypropyl cellulose, carboxyethyl cellulose, hydroxypropyl methyl cellulose, and hydroxypropyl ethyl cellulose.

4. The battery according to claim 1, wherein the first binder in an aqueous solution containing 1 mass % of the first binder has a viscosity from 10 mPa·s to 18,000 mPa·s.

5. The battery according to claim 1, wherein a mass ratio of the first binder to the second binder is in a range of 1:99 to 90:10.

6. The battery according to claim 1, wherein a mass ratio of the binder to the grains of the active material is in a range of 20:80 to 0.5:99.5.

7. The battery according to claim 1, wherein a mass ratio of the binder to the grains of the active material is in a range of 20:80 to 1:99.

8. The battery according to claim 1, wherein the negative electrode includes:
a current collector; and
an active material layer provided on at least a surface of the current collector and including the grains of the active material and the binder.

9. The battery according to claim 8, wherein a peel strength between the active material layer and the current collector is from 0.1 mN/mm to 80 mN/mm.

10. A negative electrode, comprising:
an active material having grains; and
a binder having a reticulated structure,
wherein spaces between the grains of the active material are filled with the reticulated structure of the binder,
wherein the reticulated structure has an average pore size from 900 nm to 5 μm,
wherein the binder includes:
a first binder including at least one of carboxyalkyl cellulose and a metallic salt thereof; and
a second binder including at least one of a styrene butadiene rubber and a derivative thereof
wherein the second binder has an average grain size from 80 nm to 200 nm.

11. A battery pack, comprising:
the battery according to claim 1; and
a controller configured to control the battery.

12. An electronic device comprising the battery according to claim 1, wherein the electronic device is configured to receive power from the battery.

13. An electrically driven vehicle, comprising:
the battery according to claim 1;
a converter configured to receive power from the battery and convert the power into a driving force for the electrically driven vehicle; and
a controller configured to process information associated with vehicle control based on battery-related information.

14. A power storage device comprising the battery according to claim 1, wherein the power storage device is configured to supply power to an electronic device connected to the battery.

15. The power storage device according to claim 14, further comprising a power-related information controller configured to transmit and receive a signal to and from another device through a network, wherein
the battery is configured to be charged and discharged based on information received by the power-related information controller.

16. A power system comprising the battery according to claim 1, wherein the power system is configured to receive power from the battery.

17. The power system according to claim 16, wherein the battery is configured to receive power from a power generator or an electric power network.

* * * * *